US010384117B2

(12) United States Patent
Ma

(10) Patent No.: US 10,384,117 B2
(45) Date of Patent: *Aug. 20, 2019

(54) DRY LAND SKI

(71) Applicant: Feiyu Ma, Laguna Niguel, CA (US)

(72) Inventor: Feiyu Ma, Laguna Niguel, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/911,949

(22) Filed: Mar. 5, 2018

(65) Prior Publication Data

US 2018/0193723 A1    Jul. 12, 2018

Related U.S. Application Data

(63) Continuation of application No. 15/516,218, filed as application No. PCT/US2014/059034 on Oct. 3, 2014, now Pat. No. 9,908,031.

(51) Int. Cl.
A63C 17/00 (2006.01)
A63C 17/04 (2006.01)
(Continued)

(52) U.S. Cl.
CPC .......... *A63C 17/045* (2013.01); *B62D 9/007* (2013.01); *B62K 3/002* (2013.01); *B62L 1/12* (2013.01);
(Continued)

(58) Field of Classification Search
CPC ......... A63C 17/045; B62L 3/026; B62L 4/04; B62K 3/002; B62D 11/08; B62D 9/007
See application file for complete search history.

(56) References Cited

U.S. PATENT DOCUMENTS 4,133,546 A * 1/1979 Rosenblum ............ A63C 5/035
                                                    280/842
4,943,072 A * 7/1990 Henig .................. A63C 17/045
                                                    280/11.215
(Continued)

FOREIGN PATENT DOCUMENTS

FR    2358907 A1 * 2/1978    ......... A63C 17/0046
FR    2358907 A1    2/1978
(Continued)

OTHER PUBLICATIONS

PCT/US2014/059034 International Search Report dated Jun. 29, 2015.

*Primary Examiner* — James A Shriver, II
*Assistant Examiner* — Steve Clemmons
(74) *Attorney, Agent, or Firm* — Wagenknecht IP Law Group, PC

(57) ABSTRACT

Provided herein is a training device configured to allow a user to simulate all of the balancing and turning movements of downhill snow skiing or snowboarding on dry, downhill surfaces. The device is equipped with a braking system that allows the user to slow down the speed of travel when the moving direction changes from forward to sideways, thereby simulating the act of slowing down on a slope by turning a ski or snowboard. The braking effect is further enhanced when the ski or snowboard is tilted towards the uphill direction, further simulating the actual movements of skiing or snowboarding on snow. The braking system may include one or more mechanisms to amplify the force applied to the brake cables. An optional steering bar may be provided with handles that are positioned ahead of the bar to simulate the planting of ski poles prior to or during a turn.

16 Claims, 17 Drawing Sheets

(51) Int. Cl.
*B62L 1/12* (2006.01)
*B62L 3/02* (2006.01)
*B62K 3/00* (2006.01)
*B62D 9/00* (2006.01)

(52) U.S. Cl.
CPC ............... *B62L 3/02* (2013.01); *B62L 3/026* (2013.01); *B62K 2202/00* (2013.01)

(56) References Cited

U.S. PATENT DOCUMENTS

| | | | | |
|---|---|---|---|---|
| 4,943,075 A | * | 7/1990 | Gates | A63C 17/045 188/72.9 |
| 5,312,120 A | * | 5/1994 | Wiegner | A63C 17/0073 280/11.212 |
| 5,551,717 A | * | 9/1996 | De Courcey Milne | A63C 17/01 280/11.27 |
| 5,924,710 A | * | 7/1999 | de Courcey Milne | A63C 17/0046 280/11.28 |
| 5,954,349 A | | 9/1999 | Ruetzel | |
| 6,439,584 B1 | * | 8/2002 | Lai | A63C 17/04 280/11.221 |
| 6,488,295 B1 | * | 12/2002 | Bryant | B62K 3/002 280/87.041 |
| 6,676,138 B1 | | 1/2004 | Rosso | |
| 7,314,223 B2 | * | 1/2008 | Lin | A63C 17/01 280/11.214 |
| 8,500,135 B2 | | 8/2013 | Peruffo | |
| 8,540,284 B2 | * | 9/2013 | Falanga | F16D 55/226 280/842 |
| 8,870,193 B2 | * | 10/2014 | Kowalski | A63C 5/035 280/11.223 |
| 9,908,031 B2 | | 3/2018 | Ma | |
| 2005/0077120 A1 | | 4/2005 | Scura | |
| 2006/0108753 A1 | * | 5/2006 | Harnden | A63C 17/01 280/11.27 |

FOREIGN PATENT DOCUMENTS

| | | | | |
|---|---|---|---|---|
| FR | 2840538 A1 | * | 12/2003 | ............. A63C 17/01 |
| FR | 2840538 A1 | | 12/2003 | |
| GB | 2408692 A | * | 6/2005 | ............. A63C 17/01 |
| GB | 2408692 A | | 6/2005 | |
| KR | 101243264 B1 | | 3/2013 | |

* cited by examiner

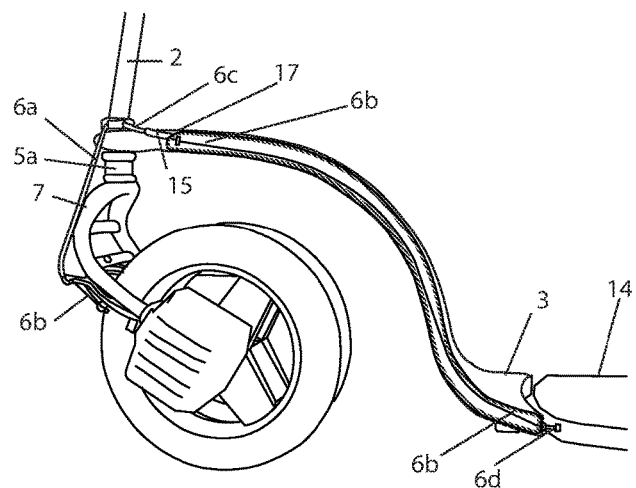
Figure 9
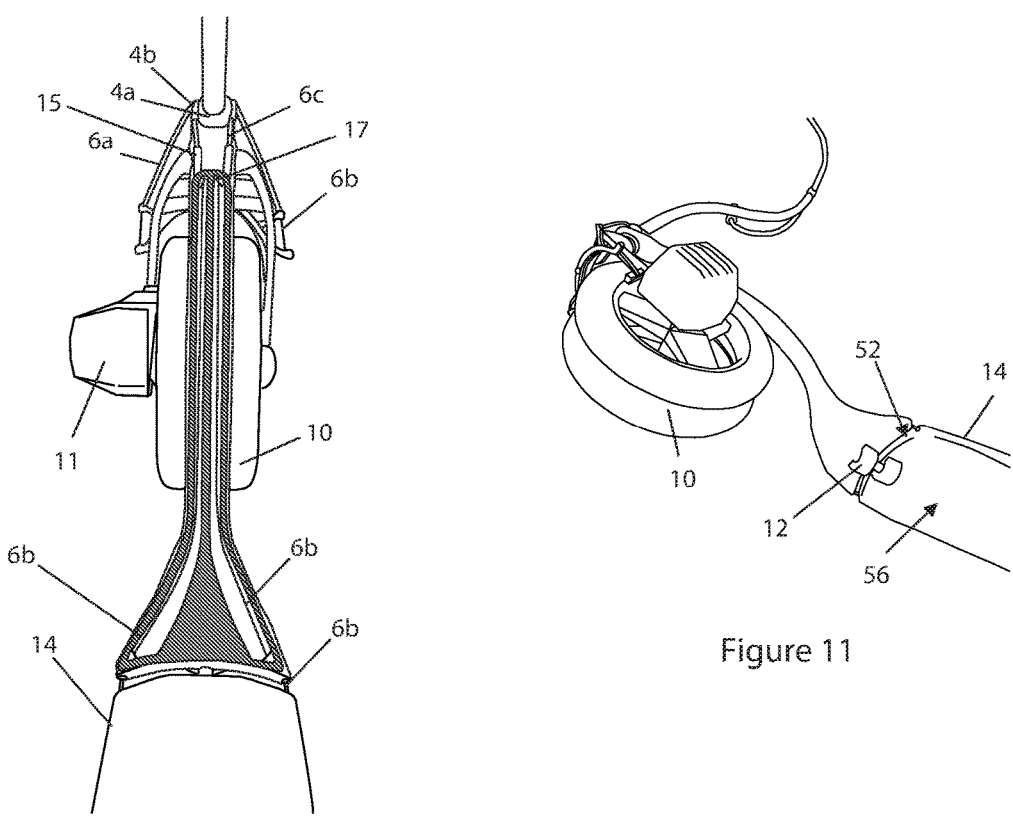
Figure 10
Figure 11

DRY LAND SKI

CROSS REFERENCE TO RELATED APPLICATION(S)

This is a continuation patent application under 35 U.S.C. § 120 of U.S. application Ser. No. 15/516,218, filed Mar. 31, 2017, now pending, which is a US national phase application under 35 U.S.C. § 371 of international patent application no. PCT/US2014/059034, filed Oct. 3, 2014, the entire content of each of which is incorporated herein by reference

BACKGROUND OF THE INVENTION

Field of the Invention

The invention relates generally to a training device and more particularly to a training device for use in acquiring balancing abilities, skills and techniques related to board-riding sports such as snowboarding and skiing.

Background Information

Board-riding sports require the individual to posture generally upright on a board's planar surface. The rider frequently adjusts his or her balance to remain upright on the board. The skill required to ride a snowboard is generally similar to riding other boards. In snowboarding, changing directions, itself, requires balance adjustments that alter the snowboard's direction of travel over the surface of the snow's terrain. The edges of the board displace surface snow as the board travels. The rider balances by applying pressure to the planar surface and edges of the board through the lower extremities.

Skiers and other sliding sport enthusiasts begin their sport without the ability to control their speed, and/or their direction of travel. This lack of control causes embarrassment, anxiety, and sometimes injury. Beginners frequently fall hard on the ground or slide out of control, often into people or obstacles. Most beginning skiers first learn to control their speed with a braking wedge maneuver, and later learn to control speed with turning.

One problem, however, that exists with the participation in many of these sports is that these activities must often be performed in locations under conditions that are not easily reproducible in other locations. Hence, one's ability to master certain skills related to the use of these devices is limited since weather and geographical constraints may limit the amount of time that one may devote to mastering these skills.

Accordingly, a need exists for a training device that simulates all of the balancing and turning movements of downhill snow skiing or snowboarding on dry, downhill surfaces.

SUMMARY OF THE INVENTION

The present invention is based on the design of a training device configured to allow a user to simulate all of the balancing and turning movements of downhill snow skiing or snowboarding on dry, downhill surfaces.

Accordingly, in one aspect, the invention provides a training device. The training device includes a footboard having a top surface, a front surface and a back surface, a front neck attached to the front surface of the footboard and pivotally attached to a front fork, a rear neck attached to the back surface of the footboard and pivotally attached to a rear fork, one or more front wheels rotatably attached to the front fork, one or more rear wheels rotatably attached to the rear fork, and a braking system. The braking system includes a front brake scissor assembly fixedly attached to the front fork and including a first front brake arm and a second front brake arm, a first front brake cable having a first end fixedly attached to the first front brake arm and a second end fixedly attached to the front surface of the footboard, wherein the first front brake cable is movably disposed within a first front rigid tube mounted to the front fork and a first front flexible tube disposed within the front neck, a second front brake cable having a first end fixedly attached to the second front brake arm and a second end fixedly attached to the front surface of the footboard, wherein the second front brake cable is movably disposed within a second front rigid tube mounted to the front fork and a second front flexible tube disposed within the front neck. Thus, when the front fork is turned by a user tension is applied to the first or second front brake cable, thereby urging the front brake scissor assembly to contact the front wheels.

In certain embodiments, the front neck is hingedly attached to the front surface of the footboard and the rear neck is hingedly attached to the back surface of the footboard. As such, when a user shifts its weight left or right, additional tension is applied to the first or second front brake cable, thereby urging the front brake scissor assembly to contact the front wheels with greater force as compared to when a user turns the front fork.

In various embodiments, the braking system may further include a rear brake scissor assembly fixedly attached to the rear fork and including a first rear brake arm and a second rear brake arm, a first rear brake cable having a first end fixedly attached to the first rear brake arm and a second end fixedly attached to the rear surface of the footboard, wherein the first rear brake cable is movably disposed within a first rear tube mounted to the rear fork and a first rear flexible tube disposed within the rear neck, and a second rear brake cable having a first end fixedly attached to the second rear brake arm and a second end fixedly attached to the rear surface of the footboard, wherein the second rear brake cable is movably disposed within a second rear tube mounted to the rear fork and a second rear flexible tube disposed within the rear neck. Thus, when the front fork is turned by a user tension is simultaneously applied to the first or second front brake cable and to the first or second rear brake cable, thereby urging the front brake scissor assembly to contact the front wheels and the rear brake scissor assembly to contact the rear wheels In another aspect, the invention provides a training device that includes a footboard having a top surface, a front surface and a back surface, a front neck hingedly attached to the front surface of the footboard and pivotally attached to a front fork, a rear neck hingedly attached to the back surface of the footboard and pivotally attached to a rear fork, one or more front wheels rotatably attached to the front fork, one or more rear wheels rotatably attached to the rear fork, and a braking system. The braking system includes a front brake scissor assembly fixedly attached to the front fork and including a first front brake arm and a second front brake arm, a rear brake scissor assembly fixedly attached to the rear fork and including a first rear brake arm and a second rear brake arm, a first front brake cable having a first end fixedly attached to the first front brake arm and a second end fixedly attached to the front surface of the footboard, wherein the first front brake cable is movably disposed within a first front rigid tube mounted to the front fork and a first front flexible tube disposed within the front neck, a second front brake cable having a first end fixedly attached to the second front brake arm and a second end fixedly attached to the front surface of the footboard, wherein the second front brake cable is movably disposed within a second front rigid tube mounted to the front fork and a second front flexible tube disposed within the front neck, a first rear brake cable having a first end fixedly attached to the first rear brake arm and a second end fixedly attached to the rear surface of the footboard, wherein the first rear brake cable is movably disposed within a first rear tube mounted to the rear fork and a first rear flexible tube disposed within the rear neck, and a second rear brake cable having a first end fixedly attached to the second rear brake arm and a second end fixedly attached to the rear surface of the footboard, wherein the second rear brake cable is movably disposed within a second rear tube mounted to the rear fork and a second rear flexible tube disposed within the rear neck. Thus, when the front fork is turned by a user tension is simultaneously applied to the first or second front brake cable and to the first or second rear brake cable, thereby urging the front brake scissor assembly to contact the front wheels and the rear brake scissor assembly to contact the rear wheels, and when a user shifts its weight left or right, additional tension is applied to the first or second front brake cable and to the first or second rear brake cable, thereby urging the front brake scissor assembly to contact the front wheels and the rear brake scissor assembly to contact the rear wheels with greater force as compared to when a user turns the front fork.

In various embodiments, the training device further includes a handle bar having a first and second hand grip, and detachably attached to the front fork, wherein when a user turns the handle bar to the left the front wheels turn left, thereby urging the first front and first rear braking arms to respectively contact the front and rear wheels, and wherein when a user turns the handle bar to the right, the front wheels turn right, thereby urging the second front and second rear braking arms to respectively contact the front and rear wheels. The training device may further include a front torsional spring mounted to the pivotal attachment between the front neck and the front fork and/or a rear torsional spring mounted to the pivotal attachment between the rear neck and the rear fork.

In various embodiments, the training device may include a seat fixedly mounted to the front neck, and may also include a first and second foot pedal, each fixedly mounted to opposite ends of an axle of rotation of the front wheels, wherein the first and second foot petals are offset by 180° from each other with respect to the direction of rotation of the wheels. In certain embodiments, the footboard may include a left footboard and a right footboard, each independently hingedly attached to the front neck and rear neck.

In another aspect, the invention provides a training system. The training system includes a first and a second training device. Each of the first and second training device includes a footboard having a top surface, a front surface and a back surface, a front neck attached to the front surface of the footboard and pivotally attached to a front fork, a rear neck attached to the back surface of the footboard and pivotally attached to a rear fork, one or more front wheels rotatably attached to the front fork, one or more rear wheels rotatably attached to the rear fork, and a braking system. The braking system includes a front brake scissor assembly fixedly attached to the front fork and including a first front brake arm and a second front brake arm, a first front brake cable having a first end fixedly attached to the first front brake arm and a second end fixedly attached to the front surface of the footboard, wherein the first front brake cable is movably disposed within a first front rigid tube mounted to the front fork and a first front flexible tube mounted to front neck, a second front brake cable having a first end fixedly attached to the second front brake arm and a second end fixedly attached to the front surface of the footboard, wherein the second front brake cable is movably disposed within a second front rigid tube mounted to the front fork and a second front flexible tube mounted to front neck. Thus, when the front fork is turned by a user tension is applied to the first or second front brake cable, thereby urging the front brake scissor assembly to contact the front wheels.

In certain embodiments, the front neck of each training device is hingedly attached to the front surface of the footboard and the rear neck of each training device is hingedly attached to the back surface of the footboard. As such, when a user shifts its weight left or right, additional tension is applied to the first or second front brake cable of each training device, thereby urging the front brake scissor assembly of each training device to contact the front wheels with greater force as compared to when a user turns the front fork of each training device.

In various embodiments, the braking system of each training device also includes a rear brake scissor assembly fixedly attached to the rear fork and including a first rear brake arm and a second rear brake arm, a first rear brake cable having a first end fixedly attached to the first rear brake arm and a second end fixedly attached to the rear surface of the footboard, wherein the first rear brake cable is movably disposed within a first rear tube mounted to the rear fork and a first rear flexible tube disposed within the rear neck, and a second rear brake cable having a first end fixedly attached to the second rear brake arm and a second end fixedly attached to the rear surface of the footboard, wherein the second rear brake cable is movably disposed within a second rear tube mounted to the rear fork and a second rear flexible tube disposed within the rear neck. As such, when the front fork is turned by a user tension is simultaneously applied to the first or second front brake cable and to the first or second rear brake cable, thereby urging the front brake scissor assembly to contact the front wheels and the rear brake scissor assembly to contact the rear wheels.

In another aspect, the invention provides a training system. The training system includes a first and a second training device. Each of the first and second training device includes a footboard having a top surface, a front surface and a back surface, a front neck hingedly attached to the front surface of the footboard and pivotally attached to a front fork, a rear neck hingedly attached to the back surface of the footboard and pivotally attached to a rear fork, one or more front wheels rotatably attached to the front fork, one or more rear wheels rotatably attached to the rear fork, and a braking system. The braking system includes a front brake scissor assembly fixedly attached to the front fork and including a first front brake arm and a second front brake arm, a rear brake scissor assembly fixedly attached to the rear fork and including a first rear brake arm and a second rear brake arm, a first front brake cable having a first end fixedly attached to the first front brake arm and a second end fixedly attached to the front surface of the footboard, wherein the first front brake cable is movably disposed within a first front rigid tube mounted to the front fork and a first front flexible tube mounted to front neck, a second front brake cable having a first end fixedly attached to the second front brake arm and a second end fixedly attached to the front surface of the footboard, wherein the second front brake cable is movably disposed within a second front rigid tube mounted to the front fork and a second front flexible tube mounted to front neck, a first rear brake cable having a first end fixedly attached to the first rear brake arm and a second end fixedly attached to the rear surface of the footboard, wherein the first rear brake cable is movably disposed within a first rear tube mounted to the rear fork, and a second rear brake cable having a first end fixedly attached to the second rear brake arm and a second end fixedly attached to the rear surface of the footboard, wherein the second rear brake cable is movably disposed within a second rear tube mounted to the rear fork. Thus, when the front fork is turned by a user tension is simultaneously applied to the first or second front brake cable and to the first or second rear brake cable, thereby urging the front brake scissor assembly to contact the front wheels and the rear brake scissor assembly to contact the rear wheels, and when a user shifts its weight left or right, additional tension is applied to the first or second front brake cable and to the first or second rear brake cable, thereby urging the front brake scissor assembly to contact the front wheels and the rear brake scissor assembly to contact the rear wheels with greater force as compared to when a user turns the front fork.

In various embodiments, the first and second training devices of the training system are fixedly attached to each other. The training system may further include a first and second handle bar, each having a hand grip, and detachably attached to the front fork of each training device, wherein when a user turns the handle bars to the left the front wheels turn left, thereby urging the first front and first rear braking arms to respectively contact the front and rear wheels, and wherein when a user turns the handle bars to the right, the front wheels turn right, thereby urging the second front and second rear braking arms to respectively contact the front and rear wheels. The training device may further include a front torsional spring mounted to the pivotal attachment between the front neck and the front fork and/or a rear torsional spring mounted to the pivotal attachment between the rear neck and the rear fork.

In yet another aspect, the invention provides a training device. The training device includes a footboard assembly, which includes a first and second footboard, each having a top surface, a front surface and a back surface, and a front crossbar and a rear crossbar fixedly attached to each other by a frame bar, wherein the front and rear crossbars are configured to attach to the first and second footboards. The training device further includes a front neck fixedly attached to the front crossbar of the footboard assembly and pivotally attached to a front fork, a rear neck fixedly attached to the rear crossbar of the footboard assembly and pivotally attached to a rear fork, one or more front wheels rotatably attached to the front fork one or more rear wheels rotatably attached to the rear fork, a handle bar fixedly attached to the front fork and having a first and second hand grip, a first braking system, and a second braking system.

The first braking system includes a first front brake scissor assembly fixedly attached to the front fork and including a first front brake arm and a second front brake arm, a first front brake cable having a first end fixedly attached to the first front brake arm and a second end fixedly attached to the front surface of the footboard, wherein the first front brake cable is movably disposed within a first front rigid tube mounted to the front fork and a first front flexible tube disposed within the front neck, and a second front brake cable having a first end fixedly attached to the second front brake arm and a second end fixedly attached to the front surface of the footboard, wherein the second front brake cable is movably disposed within a second front rigid tube mounted to the front fork and a second front flexible tube disposed within the front neck. The second braking system includes a second front brake scissor assembly fixedly attached to the front fork and including a third front brake arm and a fourth front brake arm, and a third front brake cable having a first end fixedly attached to the third front brake arm and a second end fixedly attached to a first hand control disposed on the handlebar, wherein the third front brake cable is movably disposed within a second front flexible tube disposed along the handlebar. Thus, when the front fork is turned by a user tension is applied to the first or second front brake cable, thereby urging the first front brake scissor assembly to contact the front wheels, and when a user deploys the first hand control, tension is applied to the third front brake cable, thereby urging the second front brake scissor assembly to contact the front wheels.

In various embodiments, the first braking system also includes a first rear brake scissor assembly fixedly attached to the rear fork and including a first rear brake arm and a second rear brake arm, a first rear brake cable having a first end fixedly attached to the first rear brake arm and a second end fixedly attached to the rear surface of the footboard, wherein the first rear brake cable is movably disposed within a first rear tube mounted to the rear fork and a first rear flexible tube disposed within the rear neck, and a second rear brake cable having a first end fixedly attached to the second rear brake arm and a second end fixedly attached to the rear surface of the footboard, wherein the second rear brake cable is movably disposed within a second rear tube mounted to the rear fork and a second rear flexible tube disposed within the rear neck. As such, when the front fork is turned by a user tension is simultaneously applied to the first or second front brake cable and to first or second rear brake cable, thereby urging the first front brake scissor assembly to contact the front wheels and urging the first rear brake scissor assembly to contact the rear wheels.

In various embodiments, the second braking system also includes a second rear brake scissor assembly fixedly attached to the rear fork and including a third rear brake arm and a fourth rear brake arm, and a third rear brake cable having a first end fixedly attached to the third rear brake arm and a second end fixedly attached to a second hand control disposed on the handlebar, wherein the third rear brake cable is movably disposed within a third rear flexible tube disposed under the front and rear necks. Thus, when a user deploys the second hand control, tension is applied to the third rear brake cable, thereby urging the second rear brake scissor assembly to contact the rear wheels.

In various embodiments, the first and second footboards are hingedly attached to the front and rear crossbars. As such, when a user shifts its weight left or right, additional tension is applied to the first or second front brake cable, and additional tension is applied to the first or second rear brake cable, thereby urging the front brake scissor assembly to contact the front wheels and the rear brake scissor assembly to contact the rear wheels with greater force as compared to when a user turns the front fork.

In yet another aspect, the invention provides a training device. The training device includes a footboard assembly, which includes a first and second footboard, each having a top surface, a front surface and a back surface, and a front crossbar and a rear crossbar fixedly attached to each other by a frame bar, wherein the front and rear crossbars are configured to hingedly attach to the first and second footboards. The training device further includes a front neck fixedly attached to the front crossbar of the footboard assembly and pivotally attached to a front fork, a rear neck fixedly attached to the rear crossbar of the footboard assembly and pivotally attached to a rear fork, one or more front wheels rotatably attached to the front fork one or more rear wheels rotatably attached to the rear fork, a handle bar fixedly attached to the front fork and having a first and second hand grip, a first braking system, and a second braking system.

The first braking system includes a first front brake scissor assembly fixedly attached to the front fork and including a first front brake arm and a second front brake arm, a first rear brake scissor assembly fixedly attached to the rear fork and including a first rear brake arm and a second rear brake arm, a first front brake cable having a first end fixedly attached to the first front brake arm and a second end fixedly attached to the front surface of the footboard, wherein the first front brake cable is movably disposed within a first front rigid tube mounted to the front fork and a first front flexible tube disposed within the front neck, a second front brake cable having a first end fixedly attached to the second front brake arm and a second end fixedly attached to the front surface of the footboard, wherein the second front brake cable is movably disposed within a second front rigid tube mounted to the front fork and a second front flexible tube disposed within the front neck, a first rear brake cable having a first end fixedly attached to the first rear brake arm and a second end fixedly attached to the rear surface of the footboard, wherein the first rear brake cable is movably disposed within a first rear tube mounted to the rear fork and a first rear flexible tube disposed within the rear neck, and a second rear brake cable having a first end fixedly attached to the second rear brake arm and a second end fixedly attached to the rear surface of the footboard, wherein the second rear brake cable is movably disposed within a second rear tube mounted to the rear fork and a second rear flexible tube disposed within the rear neck. The second braking system includes a second front brake scissor assembly fixedly attached to the front fork and including a third front brake arm and a fourth front brake arm, a second rear brake scissor assembly fixedly attached to the rear fork and including a third rear brake arm and a fourth rear brake arm, a third front brake cable having a first end fixedly attached to the third front brake arm and a second end fixedly attached to a first hand control disposed on the handlebar, wherein the third front brake cable is movably disposed within a second front flexible tube disposed along the handlebar, and a third rear brake cable having a first end fixedly attached to the third rear brake arm and a second end fixedly attached to a second hand control disposed on the handlebar, wherein the third rear brake cable is movably disposed within a third rear flexible tube disposed under the front and rear necks. Thus, when the front fork is turned by a user tension is simultaneously applied to the first or second front brake cable and to the first or second rear brake cable, thereby urging the front brake scissor assembly to contact the front wheels and the rear brake scissor assembly to contact the rear wheels, and when a user shifts its weight left or right, additional tension is applied to the first or second front brake cable and to the first or second rear brake cable, thereby urging the front brake scissor assembly to contact the front wheels and the rear brake scissor assembly to contact the rear wheels with greater force as compared to when a user turns the front fork.

In yet another aspect, the invention provides a training device. The training device includes a footboard having a top surface, a front surface and a back surface, the footboard being fixedly attached to a main shaft, a front neck attached to the front surface of the footboard and pivotally attached to a front fork, a rear neck attached to the back surface of the footboard and pivotally attached to a rear fork, one or more front wheels rotatably attached to the front fork, one or more rear wheels rotatably attached to the rear fork, and a braking system. The braking system includes a front brake scissor assembly fixedly attached to the front fork and including a first front brake arm and a second front brake arm, a first front brake cable having a first end fixedly attached to the first front brake arm and a second end fixedly attached to a first drum disposed on the main shaft and configured to rotate within the front neck, wherein the first front brake cable is movably disposed within a first front rigid tube mounted to the front fork and a first front flexible tube disposed within the front neck, a second front brake cable having a first end fixedly attached to the second front brake arm and a second end fixedly attached to the first drum, wherein the second front brake cable is movably disposed within a second front rigid tube mounted to the front fork and a second front flexible tube disposed within the front neck. Thus, when the front fork is turned by a user tension is applied to the first or second front brake cable, thereby urging the front brake scissor assembly to contact the front wheels. Further, when a user tilts the footboard in either direction, the main shaft rotates the first drum causing amplified tension to be applied to the first or second front brake cable, thereby urging the front brake scissor assembly to contact the front wheels.

In various embodiments, the braking system may further include a rear brake scissor assembly fixedly attached to the rear fork and including a first rear brake arm and a second rear brake arm, a first rear brake cable having a first end fixedly attached to the first rear brake arm and a second end fixedly attached to a second drum disposed on the main shaft and configured to rotate within the rear neck, wherein the first rear brake cable is movably disposed within a first rear tube mounted to the rear fork and a first rear flexible tube disposed within the rear neck, and a second rear brake cable having a first end fixedly attached to the second rear brake arm and a second end fixedly attached to the second drum, wherein the second rear brake cable is movably disposed within a second rear tube mounted to the rear fork and a second rear flexible tube disposed within the rear neck. Thus, when the front fork is turned by a user tension is simultaneously applied to the first or second front brake cable and to the first or second rear brake cable, thereby urging the front brake scissor assembly to contact the front wheels and the rear brake scissor assembly to contact the rear wheels. Further, when a user tilts the footboard in either direction, the main shaft rotates the first drum and the second drum causing amplified tension to be applied to the first or second front brake cable and to the first or second rear brake cable, thereby urging the front brake scissor assembly to contact the front wheels and the rear brake scissor assembly to contact the rear wheels.

In yet another aspect, the invention provides a training device. The training device includes a footboard having a top surface, a front surface and a back surface, the footboard being fixedly attached to a main shaft, a front neck attached to the front surface of the footboard and pivotally attached to a front fork, a rear neck attached to the back surface of the footboard and pivotally attached to a rear fork, one or more front wheels rotatably attached to the front fork, one or more rear wheels rotatably attached to the rear fork, a gearbox and a first braking system. The first gearbox includes a first primary gear fixedly attached to the main shaft, a plurality of secondary gears, and a first output shaft. The braking system includes a front brake scissor assembly fixedly attached to the front fork and including a first front brake arm and a second front brake arm, a first front brake cable having a first end fixedly attached to the first front brake arm and a second end fixedly attached to a first drum disposed on the first output shaft of the first gearbox and configured to rotate within the front neck, wherein the first front brake cable is movably disposed within a first front rigid tube mounted to the front fork and a first front flexible tube disposed within the front neck, a second front brake cable having a first end fixedly attached to the second front brake arm and a second end fixedly attached to the first drum, wherein the second front brake cable is movably disposed within a second front rigid tube mounted to the front fork and a second front flexible tube disposed within the front neck. Thus, when the front fork is turned by a user tension is applied to the first or second front brake cable, thereby urging the front brake scissor assembly to contact the front wheels. Further, wherein, when a user tilts the footboard in either direction, the main shaft rotates the gears of the first gearbox and amplifies rotation of the first drum causing amplified tension to be applied to the first or second front brake cable, thereby urging the front brake scissor assembly to contact the front wheels.

In various embodiments, the braking system may further include a second gearbox disposed within the rear neck, the second gearbox including a second primary gear fixedly attached to the main shaft, a plurality of secondary gears, and a second output shaft. The braking system may further include a rear brake scissor assembly fixedly attached to the rear fork and including a first rear brake arm and a second rear brake arm, a first rear brake cable having a first end fixedly attached to the first rear brake arm and a second end fixedly attached to a second drum disposed on the second output shaft of the second gearbox and configured to rotate within the rear neck, wherein the first rear brake cable is movably disposed within a first rear tube mounted to the rear fork and a first rear flexible tube disposed within the rear neck, and a second rear brake cable having a first end fixedly attached to the second rear brake arm and a second end fixedly attached to the second drum, wherein the second rear brake cable is movably disposed within a second rear tube mounted to the rear fork and a second rear flexible tube disposed within the rear neck. Thus, when the front fork is turned by a user tension is simultaneously applied to the first or second front brake cable and to the first or second rear brake cable, thereby urging the front brake scissor assembly to contact the front wheels and the rear brake scissor assembly to contact the rear wheels. Further, when a user tilts the footboard in either direction, the main shaft rotates the gears of the second gearbox and amplifies rotation of the first drum and the second drum causing amplified tension to be applied to the first or second front brake cable and to the first or second rear brake cable, thereby urging the front brake scissor assembly to contact the front wheels and the rear brake scissor assembly to contact the rear wheels.

In various embodiments, the training device further includes a handle bar having a first and second hand grip, and detachably attached to the front fork, wherein when a user turns the handle bar to the left the front wheels turn left, thereby urging the first front and first rear braking arms to respectively contact the front and rear wheels, and wherein when a user turns the handle bar to the right, the front wheels turn right, thereby urging the second front and second rear braking arms to respectively contact the front and rear wheels. The training device may further include a front torsional spring mounted to the pivotal attachment between the front neck and the front fork and/or a rear torsional spring mounted to the pivotal attachment between the rear neck and the rear fork.

In various embodiments, the training device may include a seat fixedly mounted to the front neck, and may also include a first and second foot pedal, each fixedly mounted to opposite ends of an axle of rotation of the front wheels, wherein the first and second foot petals are offset by 180° from each other with respect to the direction of rotation of the wheels. In certain embodiments, the footboard may include a left footboard and a right footboard, each independently hingedly attached to the front neck and rear neck.

In all aspects and embodiments of the present invention, the training device may include a single front wheel or two concentric front wheels. Likewise, the training device may include a single rear wheel or two concentric rear wheels. The training devices provided herein may further include a motor fixedly mounted to the front fork and configured to provide rotational power to the front wheels. The training devices provided herein may further include a plurality of adjustment barrels disposed at one or more ends of the first front brake cable, the second front brake cable, the third front brake cable, the first rear brake cable, the second rear brake cable, and the third rear brake cable.

BRIEF DESCRIPTION OF THE DRAWINGS

FIG. 9 is a cross-sectional view showing the brake cable (left side) placed through the inside of the left neck channel, which connects the front wheel(s)' brake (left) to the left pull-point of the footboard.

FIG. 10 is a top cross-sectional view showing two brake cables inside the neck (left and right), which connect the front wheels' brakes (left and right, respectively) to their pull-points at the footboard (left and right, respectively) through their respective neck channels.

FIG. 11 is a perspective view from below the training device showing the hinged connection of the footboard to the frame.

FIG. 16B is a partial cross-sectional view of FIG. 16A.

FIG. 19A shows an exemplary embodiment configured with one footboard, allowing two feet standing side by side to simulate a monoski with steering bar. FIG. 19B shows an exemplary embodiment configured with two boards, allowing one for each foot to simulate standard skis. FIG. 19C shows an exemplary embodiment configured with one board, allowing two feet standing front and back to simulate a snowboard.

FIG. 30A is a partial side sectional view of the front neck showing attachment of one of the brake cables to the drum. FIG. 30B is a partial top sectional view of the front neck showing attachment of both brake cables to the drum.

FIG. 31A is a partial side sectional view of the front neck showing a three-gear mechanism actuating the amplifying drum. FIG. 31B is a partial top sectional view of the front neck showing the three-dear mechanism within the front neck.

DETAILED DESCRIPTION OF THE INVENTION

Figure 1:
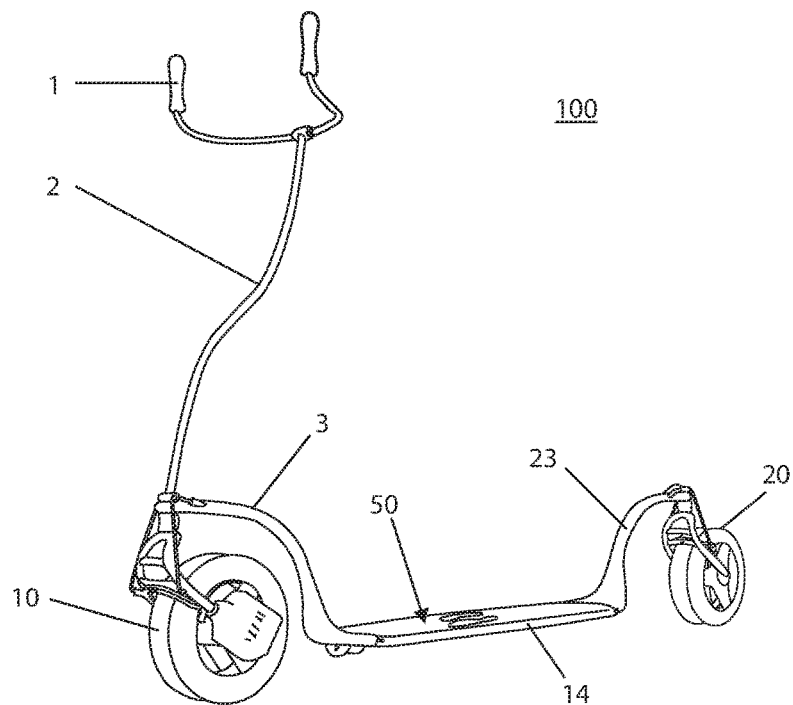
FIG. 1 is a perspective view of an exemplary embodiment of the training device. As shown, the steering bar is designed with handles ahead of the bar so that the turning of the handles simulate the initial gestures of planting of ski poles prior to and during a turn.

The present invention is based on the design of a training device configured to allow a user to simulate all of the balancing and turning movements of downhill snow skiing or snowboarding on dry, downhill surfaces. The device is equipped with a braking system that allows the user to slow down the speed of travel when the moving direction changes from forward to sideways, thereby simulating the act of slowing down on a slope by turning a ski or snowboard. The braking effect is further enhanced when the ski or snowboard is tilted towards the uphill direction, further simulating the actual movements of skiing or snowboarding on snow. An optional steering bar may be provided with handles that are positioned ahead of the bar to simulate the planting of ski poles prior to or during a turn.

Before the present compositions and methods are described, it is to be understood that this invention is not limited to the particular exemplary embodiments described herein, as such embodiments may vary. It is also to be understood that the terminology used herein is for purposes of describing the particular exemplary embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "the device" includes one or more devices, and/or embodiments of the device described herein which will become apparent to those persons skilled in the art upon reading this disclosure.

The term "comprising," which is used interchangeably with "including," "containing," or "characterized by," is inclusive or open-ended language and does not exclude additional, unrecited elements or method steps. The phrase "consisting of" excludes any element, step, or ingredient not specified in the claim. The phrase "consisting essentially of" limits the scope of a claim to the specified elements or steps and those that do not materially affect the basic and novel characteristics of the claimed invention. The present disclosure contemplates embodiments of the invention device corresponding to the scope of each of these phrases. Thus, a device comprising recited elements or steps contemplates particular embodiments in which the device consists essentially of or consists of those elements or steps.

Unless defined otherwise, all technical and scientific terms used herein have the same meaning as commonly understood by one of ordinary skill in the art to which this invention belongs. Although any methods and materials similar or equivalent to those described herein can be used in the practice or testing of the invention, the preferred materials are now described.

Referring to FIGS. 1-5, the invention provides a training device 100 configured to allow a user to simulate all of the balancing and turning movements of downhill snow skiing or snowboarding on dry, downhill surfaces. The training device includes a footboard 14 having a top surface 50, bottom surface 56, front surface 52 and back surface 54. The footboard 14 may be made from any rigid material that can support the weight of a user. Exemplary materials from which the footboard may be formed include, but are not limited to, metal, plastic, fiberglass, and carbon fiber. In certain embodiments, the footboard 14 may be constructed from materials used in the production of modern skis and snowboards.

Figure 6:
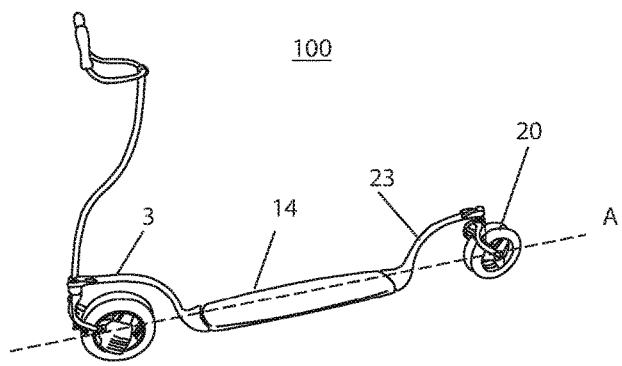
FIG. 6 is a perspective view of the training device shown in a default position.

As shown in FIGS. 1, 2, 4, 5, 11, 12, 15, and 18, the footboard 14 includes a front hinge assembly 12 fixedly attached to the bottom surface 56 and adjacent to the front surface 52 thereof. The hinge assembly 12 hingedly connects the footboard 14 to a front neck 3 such that the footboard 14 may rotate about an axis A (FIG. 6). In certain embodiments, the hinge assembly 12 includes a means for preventing the footboard 14 from rotating beyond a certain point in either direction. For example, the hinge assembly 12 may be configured to prevent the footboard 14 from rotating beyond 30°, 45°, 60°, or 90° from rest position. In certain embodiments, the hinge assembly 12 may be adjustable such that a user may set the maximum allowable rotation of the footboard 14. As used herein, the term "rest position" refers to the position of a component of the training device when the training device is not being used and/or is in use and traveling in a straight line. Thus, when used in reference to the footboard 14, the "rest position" refers to a position wherein the footboard 14 has the surface upon which a user stands (i.e., the top surface 50) facing up. Likewise, when used in reference to the front/rear wheels, the "rest position" refers to a position of the wheels wherein the training device will roll in a straight, forward direction.

The footboard 14 also includes a rear hinge assembly 22 fixedly attached to the bottom surface 56 and adjacent to the back surface 54 thereof. The rear hinge assembly 22 hingedly connects the footboard 14 to a rear neck 23 such that the footboard 14 may rotate about an axis A (FIG. 6). In various embodiments, the rear hinge assembly 22 may also include a means for preventing the footboard from rotating beyond a certain point in either direction, and may be user adjustable, as described above.

Figure 2:
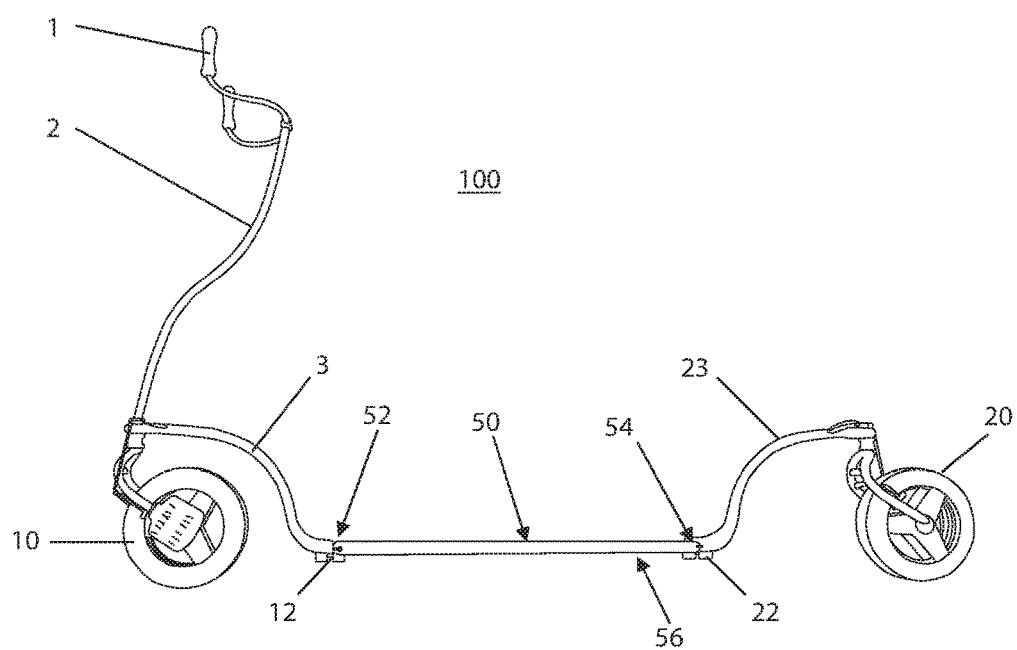
FIG. 2 is a side view of the training device.

The front and rear necks (3, 23) of the training device 100 may be made from any rigid material known in the art. Exemplary materials from which the front and rear necks may be formed include, but are not limited to, metal, plastic, fiberglass, and carbon fiber. While the necks may be formed from the same material as that of the footboard, in certain embodiments, the necks are formed from different rigid materials. As shown in FIG. 2, the front neck 3 and rear neck 23 may be shaped to include one or more curves to accommodate the wheels of the training device 100. In certain embodiments, the necks are shaped into opposing "S" curves, where the bottom portion of each "S" curve serves as the point of attachment to the respective hinge assemblies (12, 22). Formed at the ends of the necks opposite to the attachment points to the hinge assemblies are holes, each configured to accommodate the stems of a front fork 7 and a rear fork 27, respectively, thereby forming front and rear pivot assemblies (4a, 24a).

The front fork 7 and rear fork 27 of the training device 100 may be made from any rigid material known in the art. Exemplary materials from which the footboard may be formed include, but are not limited to, metal, plastic, fiberglass, and carbon fiber. While the forks may be formed from the same material as any of the footboard 14, front neck 3, or rear neck 23, in certain embodiments, the forks are formed from a different rigid materials, such as aluminum or steel. In certain embodiments, the lower arms of each fork may be replaced with and/or integrated with a shock absorbing system (not shown) to accommodate rough surfaces.

Each fork (7, 27) may be shaped to accommodate an axle (not shown) around which one or more wheels (10, 20) rotate. The wheels (10, 20) may be solid or hollow (with an inner tube), and may be formed from materials known in the art. Exemplary materials from which the wheels may be formed include, but are not limited to, rubber and plastic. While a single wheel may be mounted at each end (front/rear) of the training device 100, in various embodiments, there may be mounted two concentric wheels at each end for added stability during use.

Figure 3:
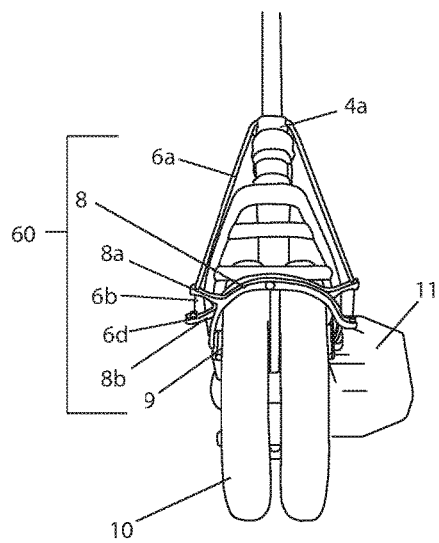
FIG. 3 is a front view of the front wheel(s) of the training device.
Figure 4:
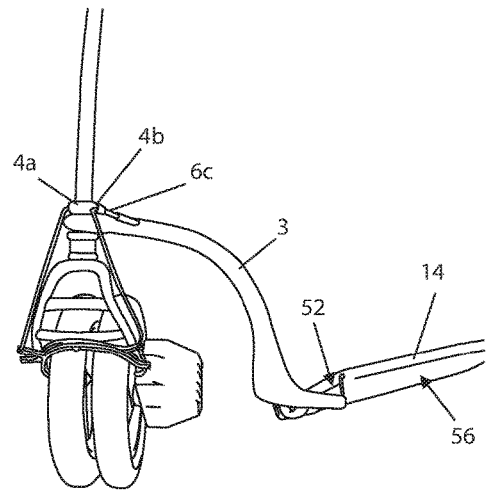
FIG. 4 is a perspective view of the front wheel(s) when turned to the left while the footboard is tilted right.
Figure 5:
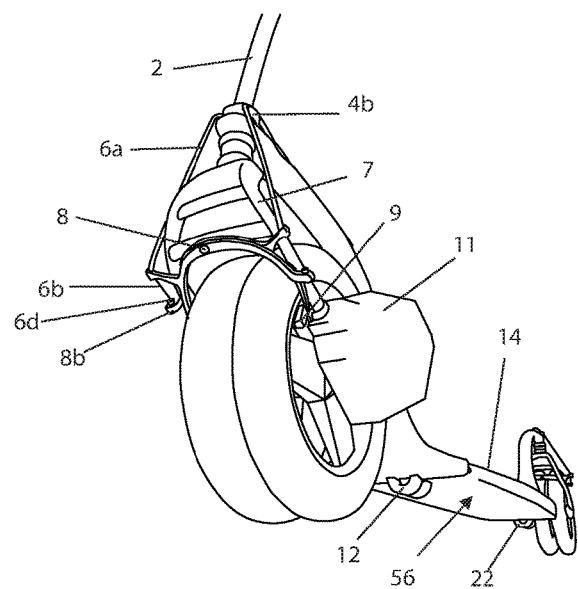
FIG. 5 is a lower perspective view of the front wheel(s) of the training device.
Figure 16A:
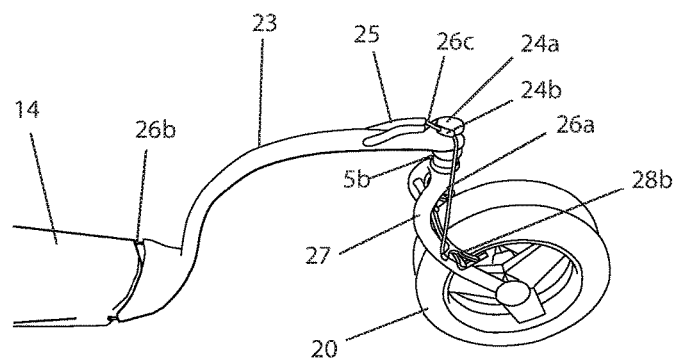
FIGS. 16A and 16B are perspective views showing the back wheel(s) of the training device.
Figure 16B:
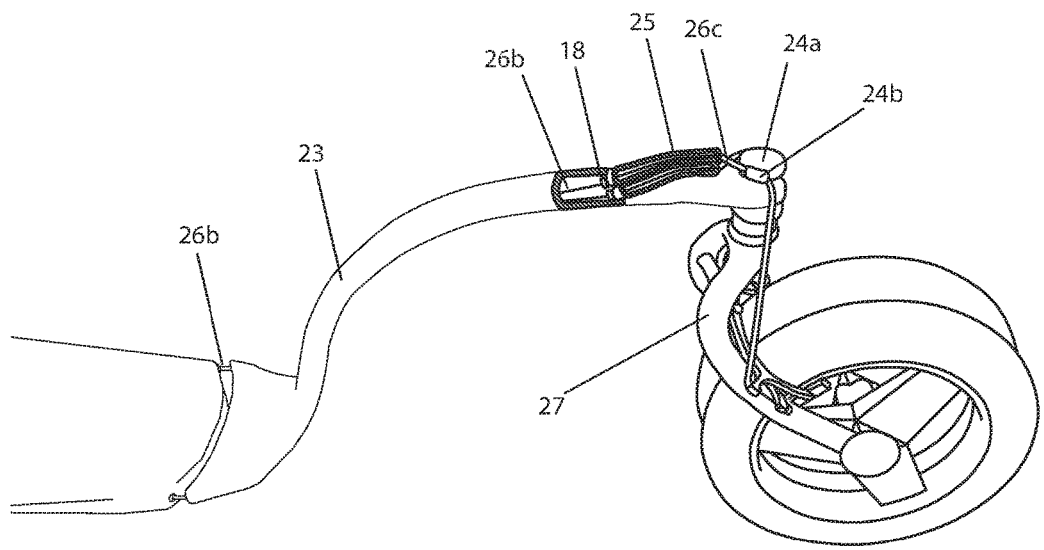

The training device 100 further includes a braking system 60. As shown in FIGS. 3, 16A, and 16B, mounted at a central position of each fork (7, 27) is a brake scissor assembly (8, 28), each of which includes a first brake arm (8a, 28a) and a second brake arm (8b, 28b). Disposed at the distal ends of each brake arm is a brake shoe 9 configured to inhibit rotation of a wheel through frictional contact therewith. Fixedly attached to the proximal ends of each brake arm is a first end of a brake cable 6b. The brake cables used in the training device 100 may be formed from materials known to those of skill in the art.

The braking system 60 includes two front brake cables 6b, one for each side (right/left) of the device. Hereinafter, the disposition of a single front brake cable 6b will be described, but it should be understood that the following description applies to both the left and right side simultaneously.

The front brake cable 6b is slidably disposed within a rigid brake tube 6a that is mounted to either side of the front fork 7. The rigid tube 6a terminates at the top portion of the front fork 7 adjacent to the front pivot assembly 4a. As shown in FIGS. 9 and 10, the front brake cable 6b exits the rigid tube 6a, passes through a rotating tube 4b fixedly mounted to the front pivot assembly 4a, and enters a flexible tube 6c mounted adjacent to the front neck 3. Flexible tube 6c terminates at front extruded guide tube 15 and is extendable along its length such that rotation of the front wheel in either direction causes the flexible tube 6c opposite to the direction of rotation to flex. Because the length of brake cable 6b is fixed, the flexing of flexible tube 6c increases tension of the brake cable 6b contained therein, resulting in an overall increase in tension along the entire brake cable 6b and application of the respective brake assembly. Thus, when the portion of brake cable 6b that is inside flexible tube 6c increases in length as the result of the turning of the wheels, the length of the portion of brake cable 6b between the lower end of rigid tube 6a and the first end of brake cable 6b at the brake arm is shortened, resulting in the application of the respective brake arm(s), which causes the brake shoe(s) 9 to contact the wheels and slow the device down. The brake cable 6b then enters the front neck 3 through front extruded guide tubes 15 at a location proximal to the front pivot assembly 4a, and exits from a location proximal to the front surface 52 of the footboard 14. Within the front neck 3, the brake cable 6b may optionally be slidably disposed within a protective tube (not shown) to prevent deterioration thereof. The second end of the front brake cable 6b may optionally be slidably disposed within a protective tube (not shown) to protect the brake cable 6b from the environment, and is fixedly attached to the front surface 52 of the footboard 14.

The training device 100 further includes two rear brake cables 26b, one for each side (right/left) of the device. Hereinafter, the disposition of a single rear brake cable 26b will be described, but it should be understood that the following description applies to both the left and right side simultaneously.

Figure 17:
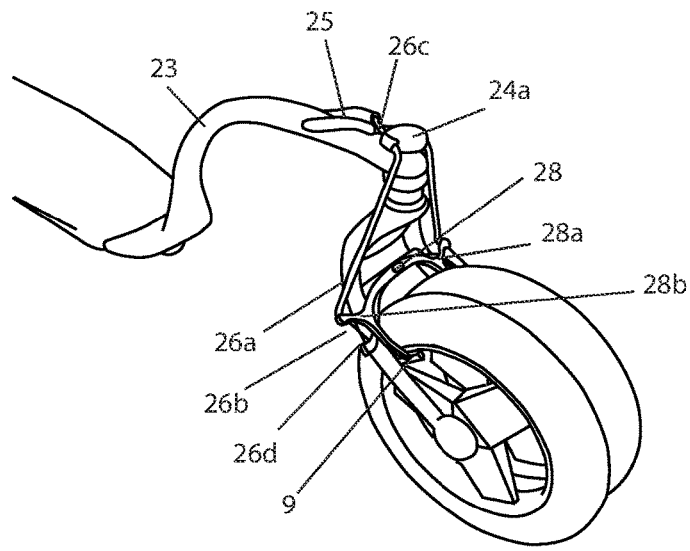
FIG. 17 is a perspective view showing left and right brake cables in relation to the back wheel(s) of the training device.
Figure 18:
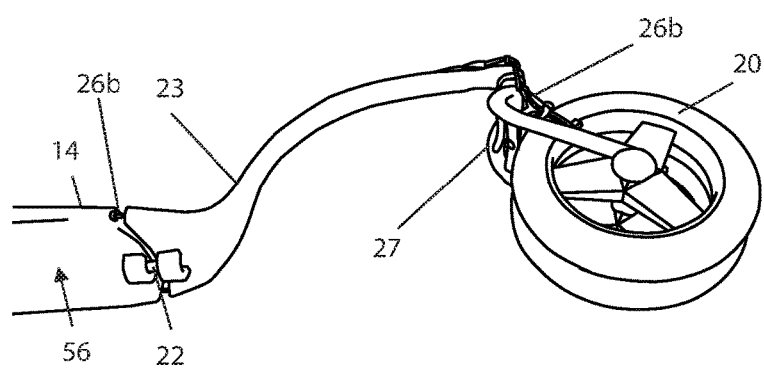
FIG. 18 is a perspective view from below the training device showing the rear axle hinge that allowing the footboard to rotate.

The rear brake cable 26b is slidably disposed within a rigid brake tube 26a that is mounted to either side of the rear fork 27. The rigid tube 26a terminates at the top portion of the rear fork 27 adjacent to the rear pivot assembly 24a. As shown in FIGS. 16-18, the rear brake cable 26b exits the rigid tube 26a, passes through a rotating tube 24b fixedly mounted to the rear pivot assembly 24a, and enters a flexible tube 26c, which is extendable along its length and mounted within the rear neck 23 such that the ends of the flexible tube 26c protrude from the rear neck 23 through rear extruded guide tubes 25 disposed at a location proximal to the rear pivot assembly 24a, and from a location proximal to the rear surface 54 of the footboard 14. The second end of the rear brake cable 26b may optionally be slidably disposed within a protective tube (not shown) to protect the brake cable 26b from the environment, and is fixedly attached to the rear surface 54 of the footboard 14. Additionally, flexible tubes 26c cross-over from left to right, and vice versa, at a point proximal to the rear pivot assembly 24a such that the opposite side rear brake arm, as compared to the front brake arm, is actuated as a result of the turning of the rear wheel 20.

Disposed at one or more of the ends of the front brake cables 6b and rear brake cables 26b may be an adjusting barrel (6d, 26d) that connects the respective brake cables to the brake scissor arms (8a, 8b, 28a, 28b) and allows for user adjustment of brake cable tension within the braking system 60. Alternatively or in addition thereto, the training device 100 may include adjusting barrels (6d, 26d) at the second ends of the brake cables (6b, 26b) to adjustably attach the brake cables (6b, 26b) to the front surface 52 and the rear surface 54 of the footboard 14, respectively. As shown in FIG. 10, the brake system 60 may further include one or more front cable stoppers 17 mounted to the front brake cables 6b within the front neck 3 and configured to prevent the front brake cables 6b from moving towards the wheels, thereby ensuring that the appropriate brake arm is actuated as a result of the turning of the wheels. Likewise, as shown in FIG. 16B, the brake system 60 may further include one or more rear cable stoppers 18 mounted to the rear brake cables 26b within the rear neck 23 and configured to allow the rear brake cables 26b to move only towards the footboard 14, thereby ensuring that the appropriate brake arm is actuated as a result of the turning of the wheels.

The training device 100 may further include one or more torsion springs (5a, 5b) mounted at the pivot assemblies (4a, 24a), and configured to return the front/rear wheels to their respective rest positions. In various embodiments, the training device 100 may include only a front torsion spring 5a mounted at the front pivot assembly 4a, or only a rear torsion spring 5b mounted at the rear pivot assembly 24a. In various embodiments, the training device 100 may include both a front torsion spring 5a mounted at the front pivot assembly 4a, and a rear torsion spring 5b mounted at the rear pivot assembly 24a.

Figure 7:
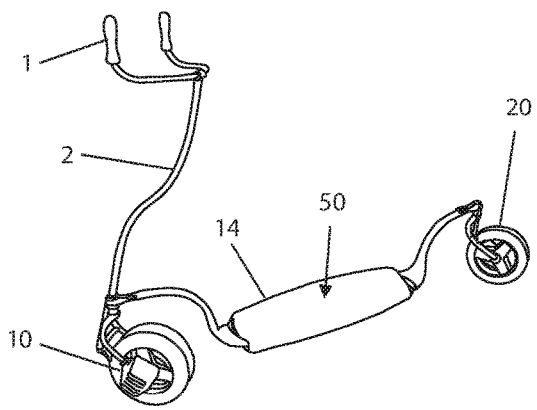
FIG. 7 is a perspective view of the training device shown turning to move towards the right. As shown, the front and back wheel(s) turn to the right, while the footboard tilts to the left.
Figure 8:
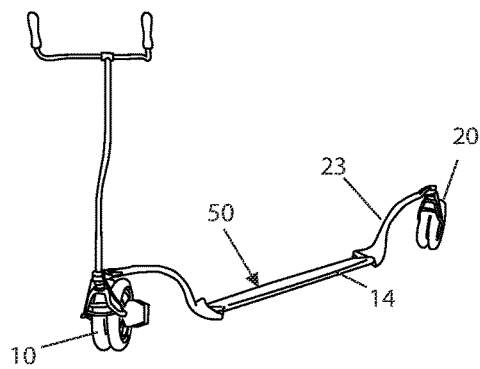
FIG. 8 is a perspective view of the training device shown turning to move towards the left. As shown, the front and back wheel(s) turn to the left, while the footboard tilts to the right.
Figure 12:
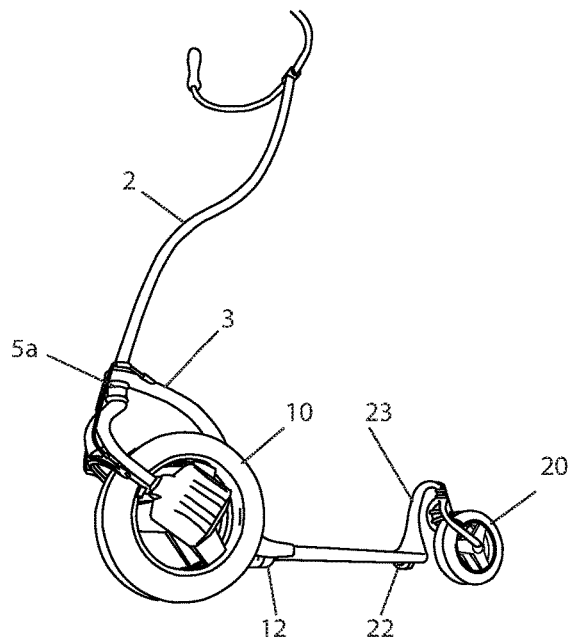
FIG. 12 is a perspective view of the training device showing the front wheel(s) turned to the right, while the footboard remains untilted.
Figure 13:
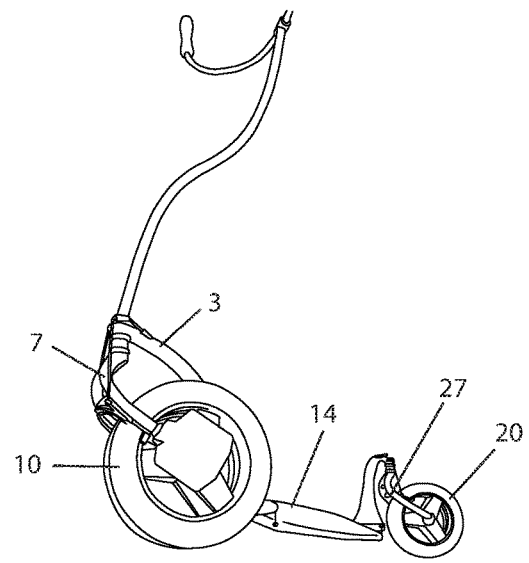
FIG. 13 is a perspective view of the training device showing the front wheels turning to the right, and the footboard tilting to the left.

The training device may further include a handle bar 2 fixedly attached to the front fork 7 and configured to allow a user to simulate the planting of a ski pole prior to and during a turn, while turning the front wheels 10. The handle bar 2 may include a first and second hand grip 1. The handle bar 2 may be detachable from the front fork 7 for advanced training. Thus, when a user turns the handle bar 2 to the left the front wheels turn left and, as a result of the frictional movement of the training device, the rear wheels 20 also turn to the left, thereby simulating a sideways slide on skis. However, the front and back wheels (10, 20) will be pulled by gravity to rotate at equal angles to simulate a carving action or skidding of skis during a turn (see, e.g., FIGS. 7 and 8).

Figure 14:
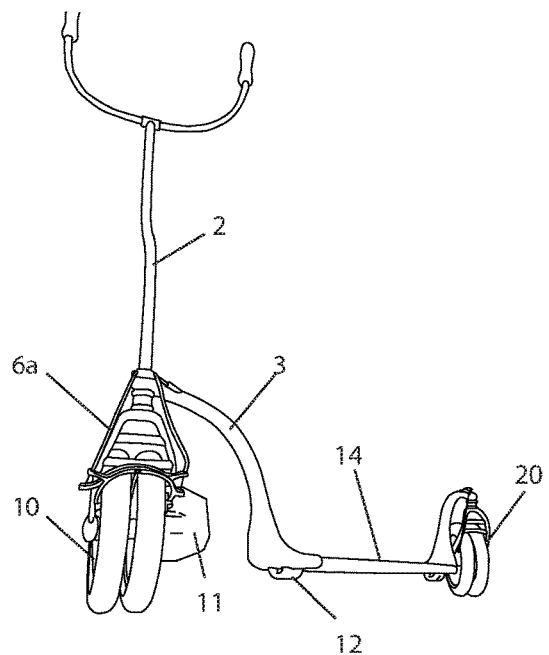
FIG. 14 is a perspective view of the training device showing the front wheel(s) turning to the left, while the footboard remains untilted.
Figure 15:
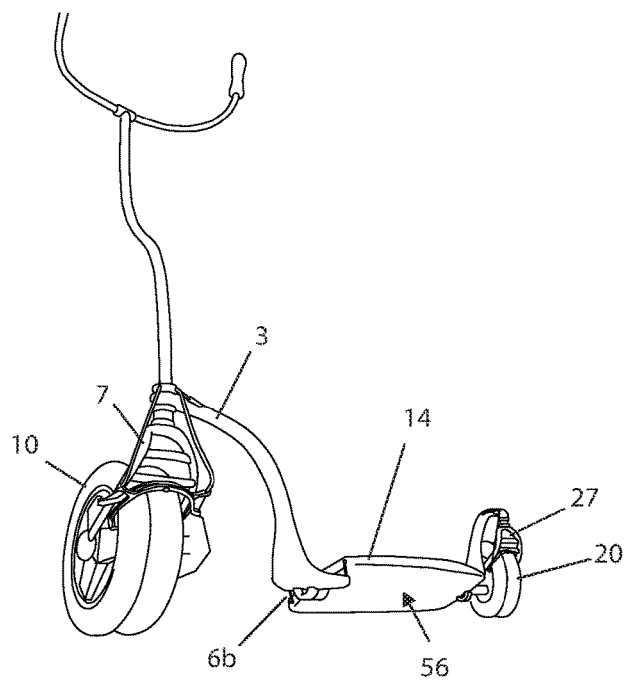
FIG. 15 is a perspective view of the training device showing the front wheels turning to the left, and the footboard tilting to the right.

As both the front and the rear wheels (10, 20) turn sideways in the same direction, and the front and rear pivot assemblies (4a, 24a) are turning at the same angle, the flexible brake cable tubes (6c, 26c) on the "uphill side" (i.e., the opposite side of the direction that the wheels are turning toward) of the footboard 14 will flex, thereby accommodating more brake cable (6b, 26b). Meanwhile, the rigid brake cable tubes (6a, 26a) on the same side, will accommodate the same length of brake cable independent of the wheel direction. Because the brake cable length is fixed between the cable stopper (17, 18) and the point of attachment to the respective brake scissor arms (8a, 8b, 28a, 28b), the turning of the wheels will cause the brake shoes to gently touch the wheel rims and slow down the wheels (see, e.g., FIGS. 12 and 14).

The user may apply further braking force by tilting the footboard towards the uphill direction. In this case, the tilting of the footboard 14 pulls on the uphill side brake cables (6b, 26b) further reducing the total length of flexible tube 26c beyond the cable stopper (17, 18), and increasing pressure applied to the brake shoes against wheels (10, 20).

Accordingly, when a user shifts its weight left, the front and rear wheels (10, 20) turn right, thereby urging the second front and second rear braking arms to respectively contact the front and rear wheels (10, 20). Likewise, when a user shifts its weight right, the front and rear wheels turn left, thereby urging the first front and first rear braking arms to respectively contact the front and rear wheels (10, 20).

The training device 100 may further include an electric motor 11 fixedly attached to the front fork 7 and configured to provide rotational power to the front wheels 10. The electric motor 11 may be connected to an electric source such as, but not limited to, a rechargeable battery pack or a solar array. The electric motor 11 may further serve as a generator to charge the rechargeable battery pack while the training device is moving by gravitational power. The electric motor 11 may further include a user-selectable on-off switch (not shown), as well as an integrated controller (not shown) to control the switching between motor and generator as conditions vary. Thus, a user may utilize the rotational power of the motor 11 for added downhill speed and/or to facilitate traveling uphill in preparation for another downhill training session.

Figure 19A:
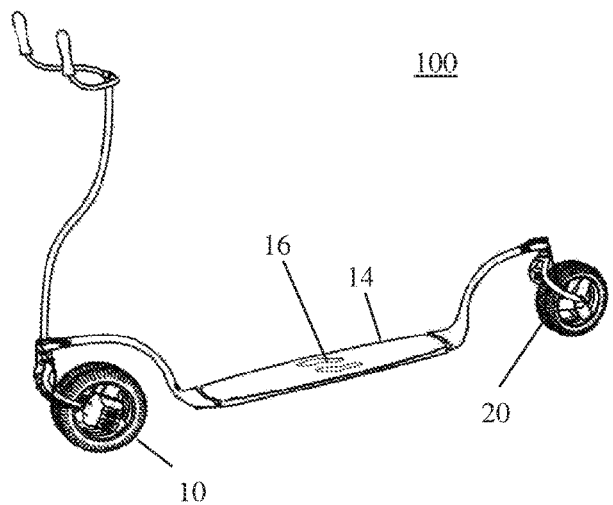
FIGS. 19A-19C are perspective views shows three different exemplary embodiments of the training device.
Figure 19B:
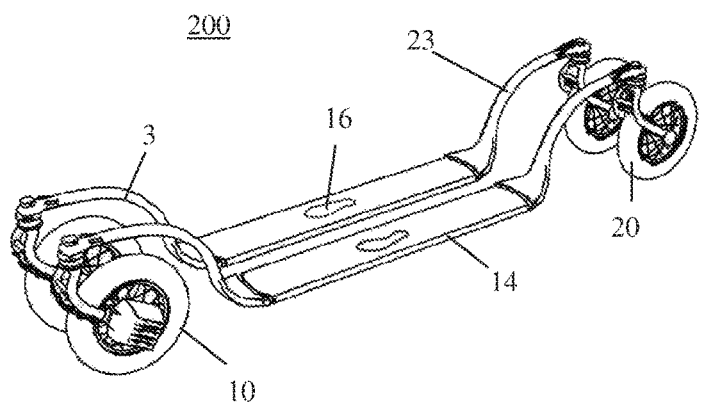
Figure 19C:
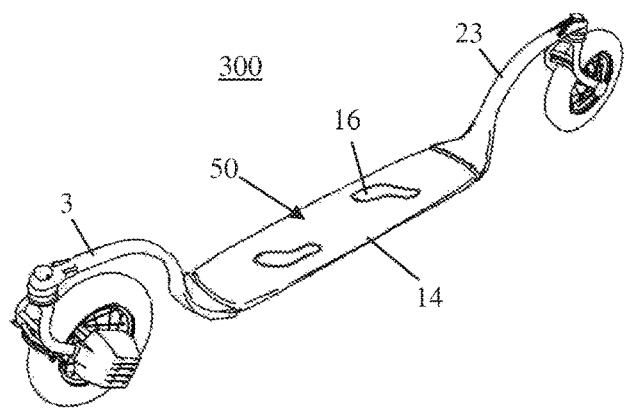
Figure 20:
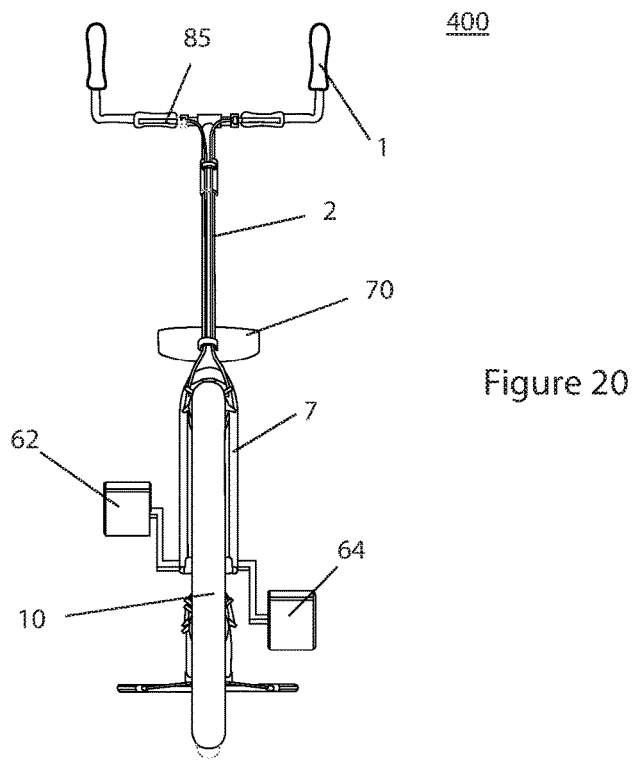
FIG. 20 is a front perspective view of an exemplary embodiment of the training device.

FIGS. 19A-19C are perspective views of various exemplary embodiments of the training device 100. FIG. 19A shows the training device 100 as has been described, with foot positions 16 referencing a monoski configuration. FIG. 19C shows the training device 300 with the handlebar 2 having been removed and including a single front wheel 10 and single rear wheel 20. As shown in FIG. 19C, foot positions 16 on footboard 14 reference a snowboard configuration.

Referring now to FIG. 19B, the invention further provides a training system 200. The training system 200 includes a first and a second training device configured to simulate independent skis. Thus, the foot positions 16 on footboard 14 are shown facing the forward direction of the system. Each training device of the training system 200 may include the features described above with reference to the training device 100, and may further include one handlebar 2 (not shown) per training device to simulate use of ski poles.

Referring now to FIGS. 20-28, another exemplary embodiment of the training device 400 is shown, wherein elements consistent with the previous embodiments are given the same element numbers. In this embodiment of the training device, there is provided a footboard assembly 31 that includes a first footboard 30 and a second footboard 32, each having a top surface 34, bottom surface (not shown), front surface 36 and back surface 38. The first and second footboards (30, 32) may be made from any rigid material that can support the weight of a user. Exemplary materials from which the footboard may be formed include, but are not limited to, metal, plastic, fiberglass, and carbon fiber. In certain embodiments, the footboards (30, 32) may be constructed from materials used in the production of modern skis and snowboards.

Figure 22:
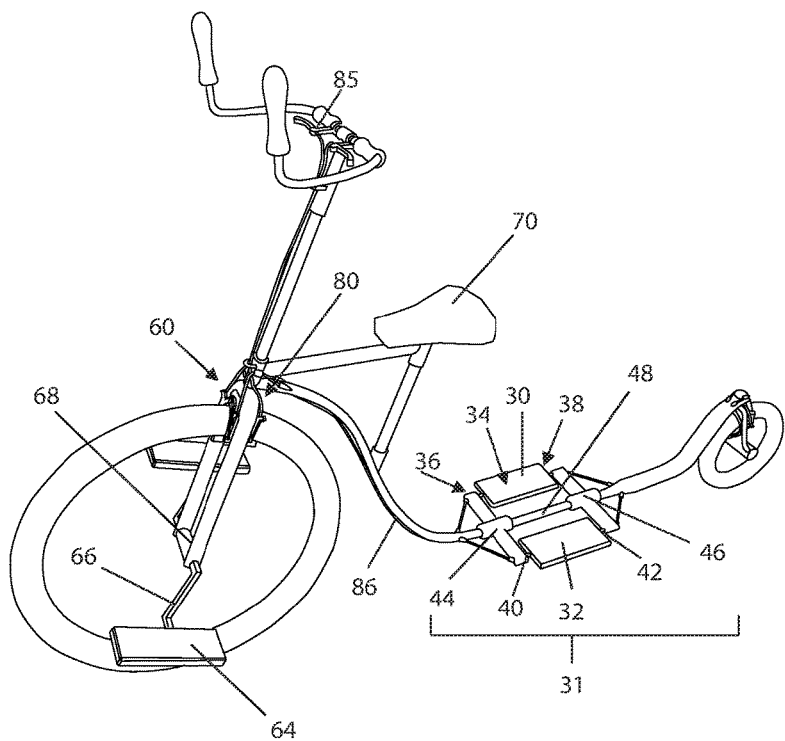
FIG. 22 is a front perspective view of the first braking system of the exemplary embodiment of the training device.

As shown in FIG. 22, the footboards (30, 32) may each include a front hinge assembly 40 fixedly attached to the front surface 36 of the footboard (30, 32) and a rear hinge assembly 42 fixedly attached to the rear surface 38 of the footboard (30, 32). Each of the front hinge assembly 40 and rear hinge assembly 42 hingedly connects the respective footboard (30, 32) to a front crossbar 44 and a rear crossbar 46, which are fixedly attached to one another by a frame bar 48. In certain embodiments, each of the hinge assemblies (40, 42) may include a means for preventing the respective footboards (30, 32) from rotating beyond a certain point in either direction. For example, the hinge assemblies (40, 42) may be configured to prevent the footboards (30, 32) from rotating beyond 30°, 45°, 60°, or 90° from rest position. In certain embodiments, the hinge assemblies (40, 42) may be adjustable such that a user may set the maximum allowable rotation of the footboards (30, 32).

The front and rear crossbars (44, 46) and the frame bar 48 may be made from any rigid material known in the art. Exemplary materials from which the crossbars may be formed include, but are not limited to, metal, plastic, fiberglass, and carbon fiber. In various embodiments the front and rear crossbars (44, 46) and the frame bar 48 are made from the same material, but the invention is not limited thereto, as these components may be independently formed from different materials.

Figure 21:
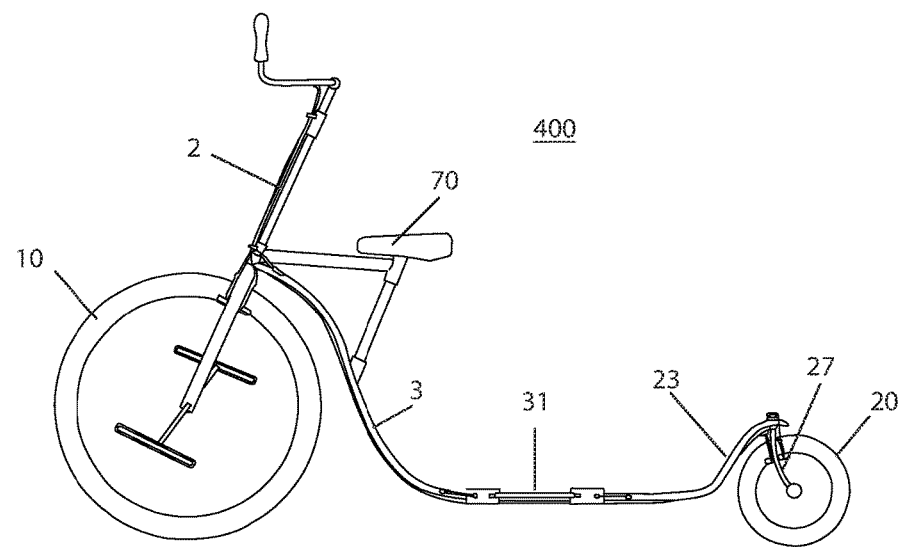
FIG. 21 is a side perspective view of an exemplary embodiment of the training device.

The front and rear crossbars (44, 46) are each fixedly attached to a front neck 3 and a rear neck 23, as was described with reference to the previous exemplary embodiments. The front and rear necks (3, 23) of the training device 400 may be made from any rigid material known in the art. While the necks may be formed from the same material as that of the footboard, in certain embodiments, the necks are formed from different rigid materials. As shown in FIG. 21, the front neck 3 of the training device 400 is sized to accommodate a front wheel 10 that is larger than the rear wheel 20. In addition, the training device 400 includes a seat 70 fixedly attached to the front neck 3, thereby allowing a user to be seated while riding, as would be done with a conventional bicycle. Thus, the training device 400 may further include a first foot pedal 62 and second foot pedal 64, each fixedly mounted to opposite ends of an axle of rotation of the front wheel 10. As in a conventional bicycle, the foot pedals (62, 64) may be mounted to the axle 68 of the front wheel 10 by means of a pair of crank arms 66, which are offset from each other by 180° with respect to the direction of rotation of the wheel 10.

Figure 23:
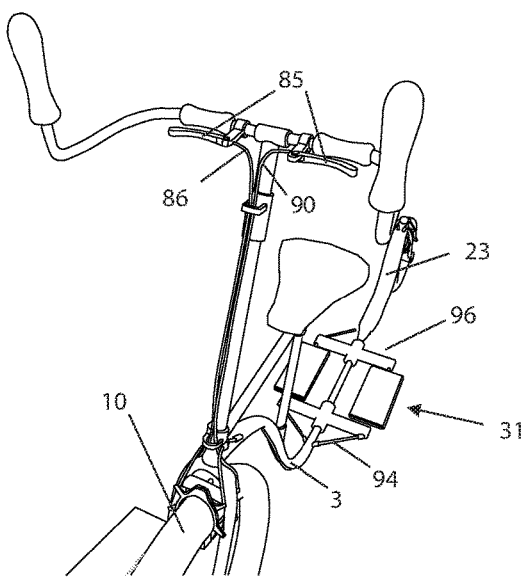
FIG. 23 is a perspective view of the second braking system of the exemplary embodiment of the training device.
Figure 26:
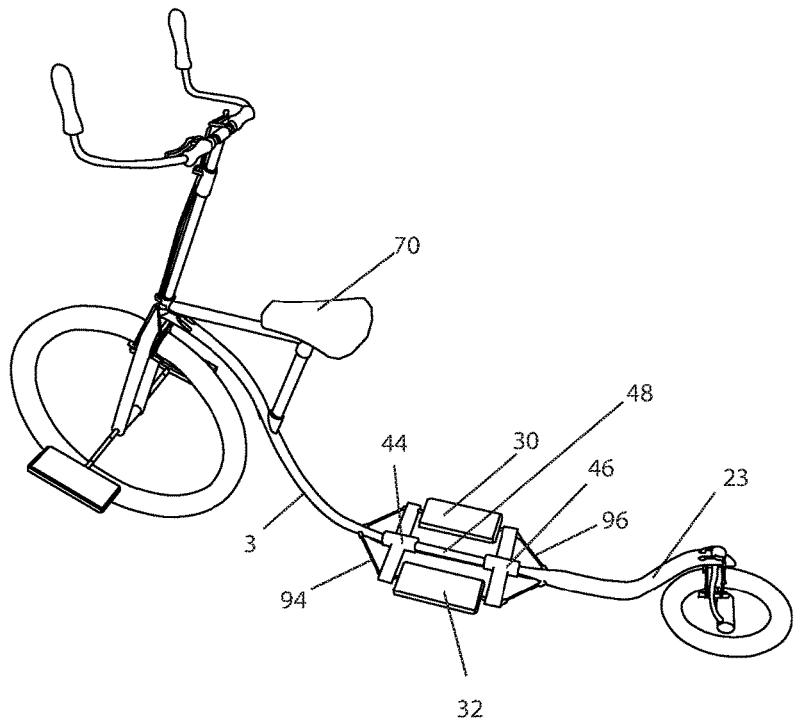
FIG. 26 is a perspective view from the top of the exemplary embodiment of the training device showing the footboard assembly.
Figure 27:
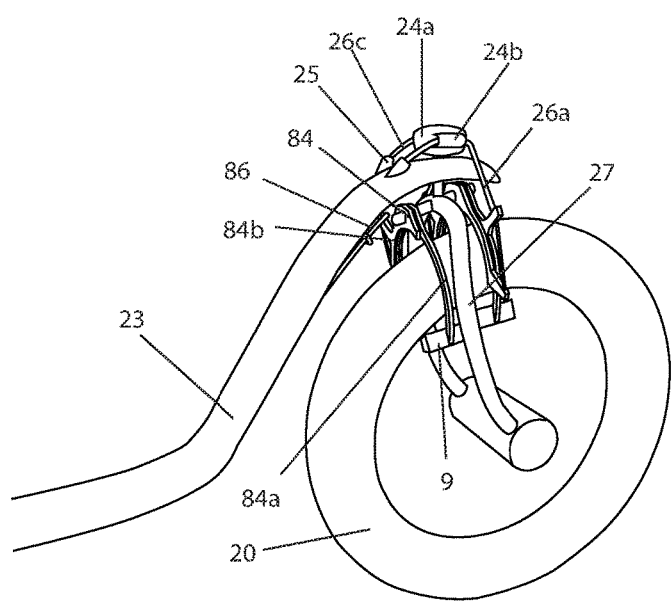
FIG. 27 is a perspective view of the second rear braking system of the exemplary embodiment of the training device.
Figure 28:
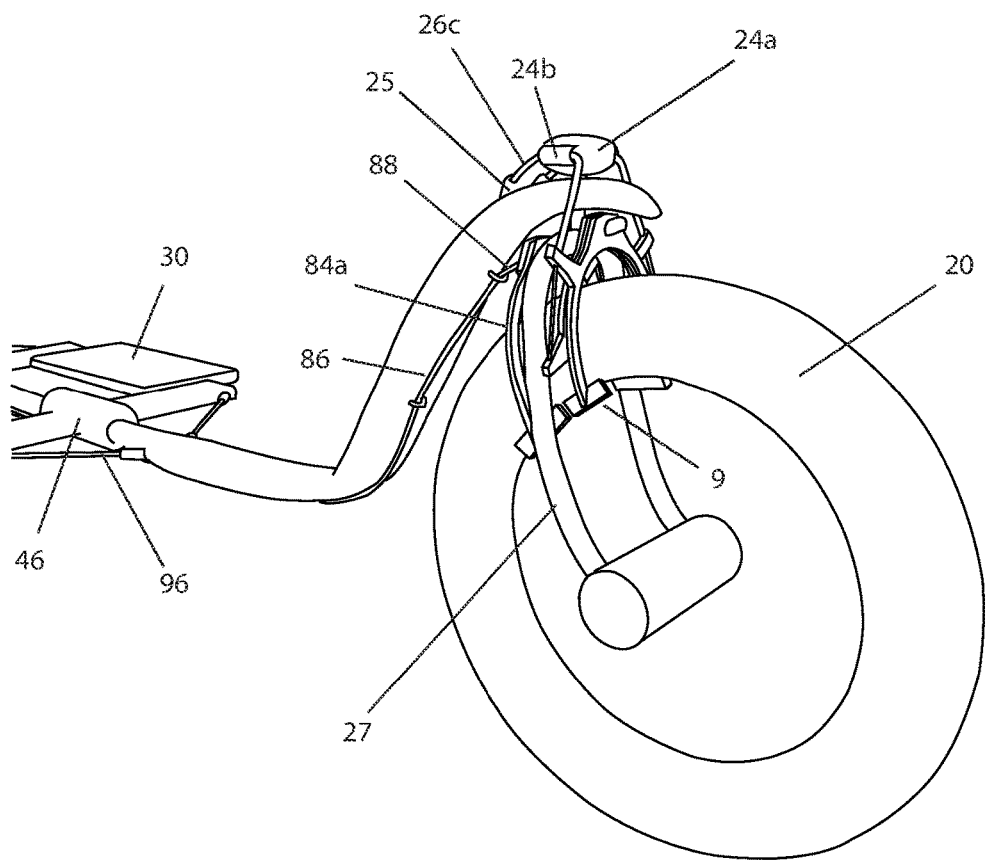
FIG. 28 is a rear perspective view of the rear neck and rear wheel of the exemplary embodiment of the training device.

Consistent with the previous exemplary embodiments, the training device 400 includes a first braking system 60, which is described above and therefore will not be repeated here. As shown in FIGS. 22, 23, and 26, the front brake cable 6b exits the front neck 3 at a location proximal to the front pivot assemblies 40 of the footboard assembly 31. Each front brake cable 6b is then slidably disposed within a protective tube 94 and passes through the front crossbar 44 for fixed attachment to the front surfaces 36 of each footboard (30, 32). Likewise, as shown in FIGS. 22, 27, and 28, each rear brake cable 26b exits the rear neck 23 at a location proximal to the rear hinge assembly 42 of the footboard assembly 31. Each rear brake cable 26b is then slidably disposed within a protective tube 96 and passes through the rear crossbar 46 for fixed attachment to the back surfaces of each footboard (30, 32). However, in this embodiment, flexible tubes 26c do not cross-over from left to right, but rather are located such that the rear brake arm on the same side as the front brake arm is actuated as a result of the turning of the rear wheel 20.

The training device 400 may further include a second braking system 80. As shown in FIGS. 25-28, the second braking system 80 includes a second brake scissor assembly (82, 84), each of which including a first brake arm (82a, 84a) and a second brake arm (82b, 84b). Disposed at the distal ends of each brake arm is a brake shoe 9 configured to inhibit rotation of a wheel through frictional contact therewith. Fixedly attached to the proximal ends of each brake arm of the second braking system 80 is a first end of a brake cable. As with the previous exemplary embodiments, the brake cables used in the training device 400 may be formed from materials known to those of skill in the art.

Unlike the first braking system 60, the second braking system 80 includes a single front brake cable 83 and a single rear brake cable 88. Hereinafter, the disposition of the front brake cable 83 of the second braking system 80 will be described.

Figure 24:
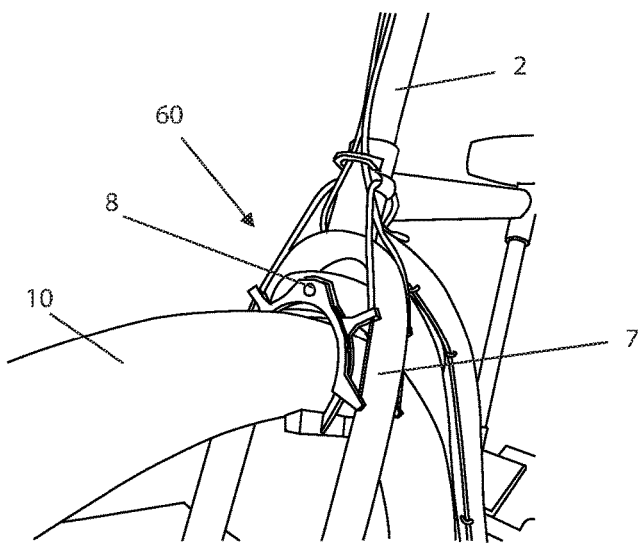
FIG. 24 is a perspective view of the exemplary embodiment of the training device.
Figure 25:
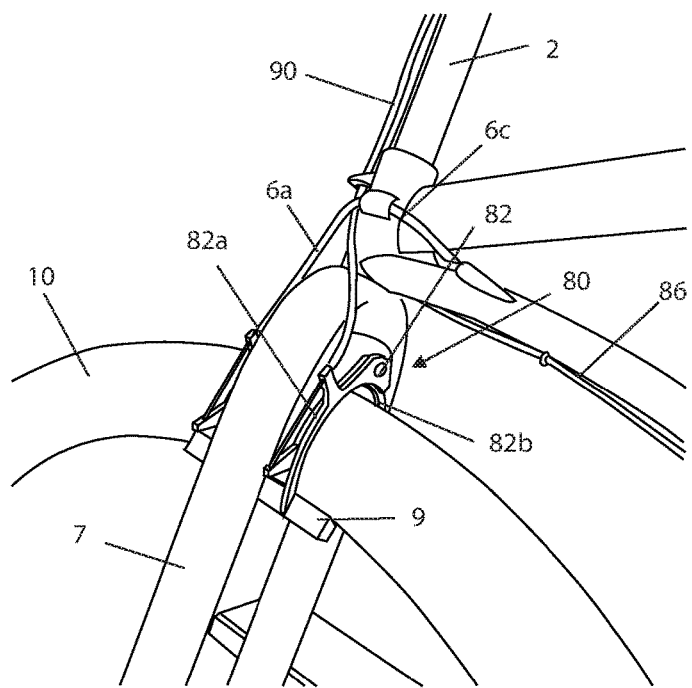
FIG. 25 is a front perspective view of the exemplary embodiment of the training device.

As shown in FIGS. 23 and 24, the front brake cable 83 is slidably disposed within a front flexible brake tube 90 that is mounted to a side of the front fork 7. The front flexible tube 90 is disposed parallel to the handlebar 2 that is fixedly attached to the front fork 7, and terminates at the top of the handlebar 2 at a hand control 85.

As shown in FIGS. 27 and 28, the rear brake cable 88 is slidably disposed within a rear flexible brake tube 86 that is mounted to the handlebar 2 that is fixedly attached to the front fork 7, with a first end terminating at the top of the handlebar 2 at a hand control 85. The rear flexible tube 86 is disposed to run under the front neck 3, the front crossbar 44, the frame bar 48, the rear crossbar 46, and the rear neck 23. The second end of the rear brake tube 86 terminates proximal to the second rear scissor assembly 84, thereby allowing the rear brake cable 88 to be fixedly attached thereto.

Disposed at one or more of the ends of the front brake cable 83 and rear brake cable 88 may be an adjusting barrel (not shown) that connects the respective brake cables to the brake scissor arms (82a, 82b, 84a, 84b) and allows for user adjustment of brake cable tension within the second braking system 80. Alternatively or in addition thereto, the training device 400 may include adjusting barrels (not shown) at the second ends of the brake cables (83, 88) to adjustably attach the brake cables to each of the hand controls 85, respectively.

Figure 29:
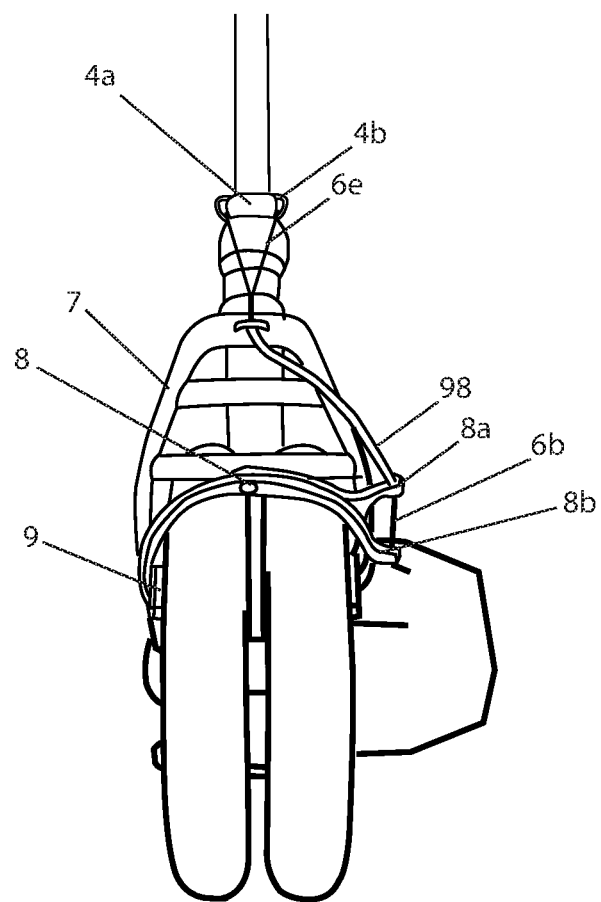
FIG. 29 is a front perspective view of an exemplary embodiment of the training device with an alternative configuration of the front braking system.

In certain embodiments, the braking system 60 of each of the above-described training devices (100, 300, 400) may have a different configuration from the one described above. As shown in FIG. 29, mounted at a central position of the front fork 7 is a brake scissor assembly 8, which includes a first brake arm 8a and a second brake arm 8b. Disposed at the distal ends of each brake arm is a brake shoe 9 configured to inhibit rotation of a wheel through frictional contact therewith. Fixedly attached to the proximal ends of each brake arm is a first end of a brake cable. The brake cables used in the training device 100 may be formed from materials known to those of skill in the art. It should be understood that for purposes of explanation, the alternative braking system is described with reference to the front brake system only. However, the alternative braking system is applicable to and therefore contemplated for use as rear brake system and/or both the front and the rear brake system.

In these embodiments, the front brake system 60 includes a single front brake cable 6b (to be referred to as the primary brake cable 6b), a first end of which being fixedly attached to each brake arm (8a, 8b) for simultaneous actuation thereof. The primary brake cable 6b is slidably disposed within a protective tube 98 that is fixedly attached to the front fork 7. The second end of the primary brake cable 6b exits the protective tube 98 and is fixedly attached to a pair of secondary front brake cables 6e, one for each side (right/left) of the device.

As described above with respect to the front brake system 60 of training device 100, each front secondary brake cables 6e passes through a rotating tube 4b fixedly mounted to the front pivot assembly 4a, and enters a flexible tube 6c, which is extendable along its length and mounted adjacent to the front neck 3 such that rotation of the front wheel in either direction causes the flexible tube 6c opposite to the direction of rotation to flex and increase tension of the brake cable 6b contained therein. The remaining features of the front brake system are identical to those described above with regard to training device 100, and therefore will not be described here for brevity.

Figure 30A:
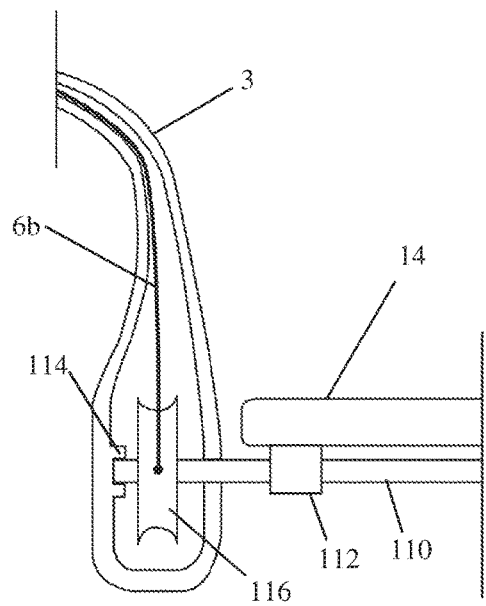
FIGS. 30A and 30B are partial sectional views of an exemplary embodiment of the training device including a drum for amplifying the effect of footboard rotation on the tension of the brake cable.
Figure 30B:
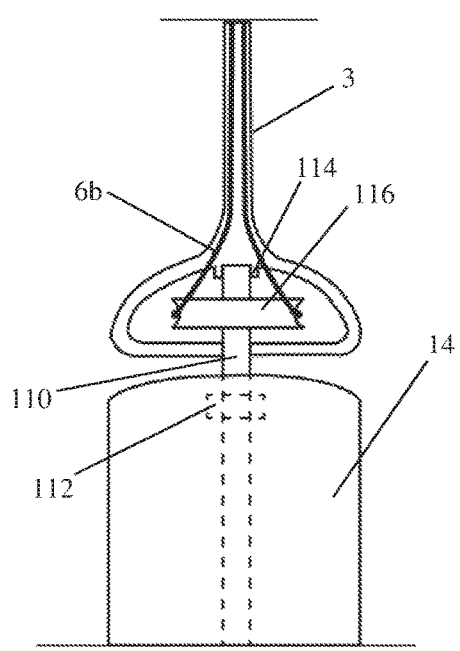

In certain embodiments, the braking system 60 of each of the above-described training devices (100, 300, 400) may have a different configuration from the one described above. As shown in FIGS. 30A and 30B, the hinge assemblies (12, 22) may include a main shaft 110 that extends from the front neck 3 to the rear neck 23, and is configured to be fixedly attached to footboard 14 by means of front and rear clamps 112. The ends of main shaft 110 protrude into each of front neck 3 and rear neck 23 and may terminate in an annular socket 114 formed in an inner surface of a wall of the front neck 3 and rear neck 23. In certain embodiments, annular socket 114 may include a rotational element, such as a roller bearing (not shown) to minimize friction during rotation of the main shaft 110. Disposed on the main shaft 110 at positions proximal to the ends thereof may be a drum 116 configured to rotate within the front and rear necks (3, 23) in accordance with the rotation of the main shaft 110.

As described above with reference to other embodiments of the training device (100, 300, 400), the front brake system 60 includes two front brake cables 6b, one for each side (right/left) of the device. To the extent that the features of the front and rear brake system are identical to those described above with regard to training devices 100, 300, and 400, only the differences will be described here for brevity.

The left and right brake cables 6b enter the front neck 3 at a location proximal to the front pivot assembly 4a and are fixedly attached to the drum 116 at positions that are essentially 180° apart from each other. Thus, when a user causes the footboard 14 to rotate in either direction, the drum 116 concentrically rotates in the same direction and applies tension to the respective brake cable 6b. Without being bound by theory, because the diameter of the drum 116 is greater than that of the main shaft 110, the tension applied to the brake cable 6b is amplified as compared to the tension that is applied in a device (100, 300, 400) having a brake system 60 without the drum 116.

It should be understood that for purposes of explanation, this alternative braking system including the amplifying drum 116 is described as including a drum 116 disposed within each of the front and rear necks (3, 23). However, in various embodiments, the braking system 60 may include a single drum 116 disposed in either of the front neck 3 or the rear neck 23. Thus, the alternative braking system is applicable to and therefore contemplated for amplifying tension applied to the front brake cables only, the rear brake cables only, or both the front and the rear brake cables.

Figure 31A:
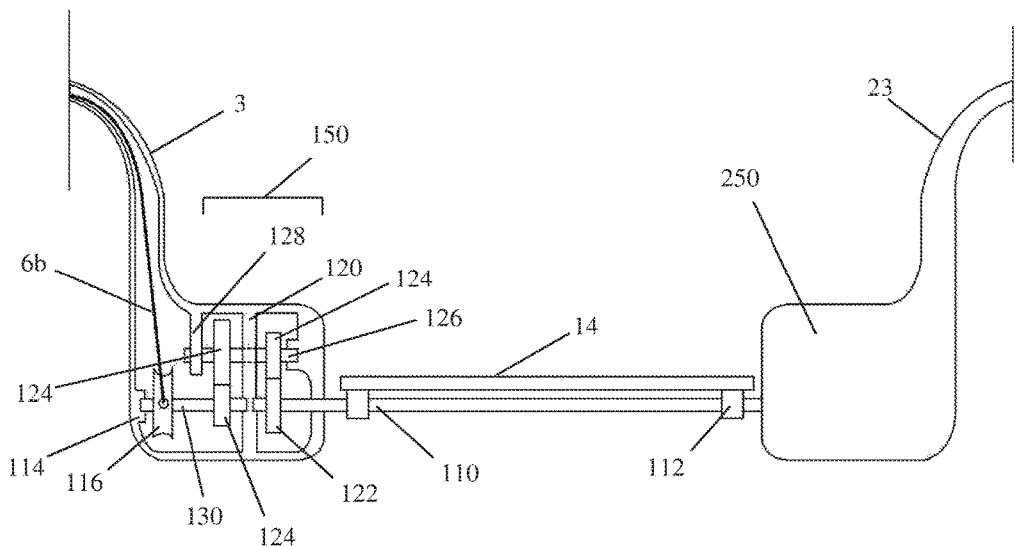
FIGS. 31A and 31B are partial sectional views of an exemplary embodiment of the training device including a plurality of gears for further amplifying the tension applied to the brake cables by the drum.
Figure 31B:
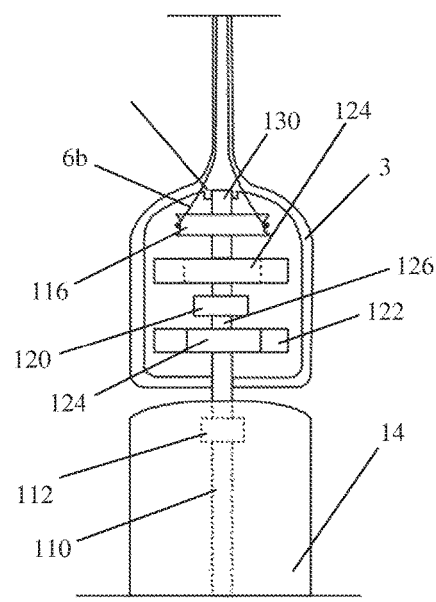

In certain embodiments, the braking system 60 of each of the above-described training devices (100, 300, 400) may have a different configuration from those described above. As discussed above with reference to FIGS. 30A and 30B, the hinge assemblies (12, 22) may include a main shaft 110 that extends from the front neck 3 to the rear neck 23, and is configured to be fixedly attached to footboard 14 by means of front and rear clamps 112. As shown in FIGS. 31A and 31B, each of the front and rear necks (3, 23) may include a gearbox (150, 250). Disposed on the main shaft 110 at positions proximal to the ends thereof may be a primary gear 122 configured to rotate within the gearbox (150, 250) of each of the front and rear necks (3, 23) in accordance with the rotation of the main shaft 110. Also disposed within the gearbox (150, 250) are a plurality of secondary gears 124, each configured to rotate in accordance with contact with the primary gear 122. While the exemplary embodiment shown in FIGS. 31A and 31B show that one primary gear 122 and three secondary gears 124 are provided in the front and rear necks, it should be understood that any number of secondary gears 124 are contemplated for use in the gearbox (150, 250) to amplify the tension applied to the brake cables 6b.

As shown in FIG. 31A, primary gear 122 is in rotational engagement with a first secondary gear 124, which is fixedly attached at a position proximal to a proximal end of a gear shaft 126. Thus, gear shaft 126 is disposed within the gearbox (150, 250) in close proximity to main shaft 110 to enable engagement of the first secondary gear 124 with primary gear 122. While gear shaft 126 is shown as being disposed above main shaft 110, it should be understood that gear shaft 126 may be mounted in any configuration (e.g., below or laterally in any direction) so long as the primary gear 122 and the secondary gear 124 are in contact with each other. Gear shaft 126 protrudes through inner wall 120 with the proximal end terminating in an annular socket 114 formed in an inner surface of a wall of the front neck 3 and rear neck 23, and a distal end terminating in an annular socket 114 of a partial wall 128 disposed within the gearbox (150, 250).

Disposed at a position proximal to the distal end of the gear shaft 126 may be a second secondary gear 124 configured to rotate in accordance with rotation of the gear shaft 126. The second secondary gear 124 may be in rotational engagement with a third secondary gear 124, which is fixedly attached to an output shaft 130 at a position proximal to a proximal end thereof. Output shaft 130 is disposed within the gearbox (150, 250) in close proximity to the gear shaft 126, with ends terminating in annular sockets 114 formed in the inner wall 120 and an inner surface of the front and rear necks (3, 23). Disposed at a position proximal to the distal end of the output shaft 130 is a drum 116 configured to rotate with rotation of the output shaft 130. In certain embodiments, any one or more of annular sockets 114 may include a rotational element, such as a roller bearing (not shown) to minimize friction during rotation of the main shaft 110, gear shaft 126, and/or the output shaft 130.

As described above with reference to other embodiments of the training device (100, 300, 400), the front brake system 60 includes two front brake cables 6b, one for each side (right/left) of the device. To the extent that the features of the front and rear brake system are identical to those described above with regard to training devices 100, 300, and 400, only the differences will be described here for brevity.

The left and right brake cables 6b enter the front neck 3 at a location proximal to the front pivot assembly 4a and are fixedly attached to the drum 116 at positions that are essentially 180° apart from each other. Thus, when a user causes the footboard 14 to rotate in either direction, primary gear 122 rotates, thereby causing each of secondary gears 124 to rotate, which in turn, causes the drum 116 to concentrically rotate and apply tension to the respective brake cable 6b. The gear ratios of the gearbox (150, 250) may be selected in accordance with the desired amplification of rotational force applied to the respective brake cables 6b as a result of the tilting of the footboard 14 by a user. As such, the resulting tension applied to the brake cable 6b is amplified as compared to the tension that is applied in a device (100, 300, 400) having a brake system 60 without a gearbox (150, 250).

It should be understood that for purposes of explanation, this alternative braking system including the gearbox (150, 250) for amplifying the rotational force applied to the drum 116 is described as including a gearbox (150, 250) within each of the front and rear necks (3, 23). However, in various embodiments, the braking system 60 may include any combination of gearbox (150, 250), drum 116 without gearbox (150, 250), or non-amplified application of brakes within the front and/or rear necks (3, 23) of the training device (100, 300, 400). Thus, the alternative braking system is applicable to and therefore contemplated for amplifying tension applied to the front brake cables only, to the rear brake cables only, or to both the front and the rear brake cables.

Although the invention has been described with reference to the above exemplary embodiments, it will be understood that modifications and variations are encompassed within the spirit and scope of the invention. Accordingly, the invention is limited only by the following claims.

What is claimed is:

1. A training system comprising a first and a second training device, wherein each training device comprises:
   (a) a footboard having a top surface, a front surface and a back surface;
   (b) a front neck attached to the front surface of the footboard and pivotally attached to a front fork;
   (c) a rear neck attached to the back surface of the footboard and pivotally attached to a rear fork;
   (d) one or more front wheels rotatably attached to the front fork;
   (e) one or more rear wheels rotatably attached to the rear forks; and
   (f) a braking system comprising:
     (i) a front brake scissor assembly fixedly attached to the front fork and including a first front brake arm and a second front brake arm;
     (ii) a first front brake cable having a first end fixedly attached to the first front brake arm and a second end fixedly attached to the front surface of the footboard, wherein the first front brake cable is movably disposed within a first front rigid tube mounted to the front fork and a first front flexible tube mounted to the front neck;
     (iii) a second front brake cable having a first end fixedly attached to the second front brake arm and a second end fixedly attached to the front surface of the footboard, wherein the second front brake cable is movably disposed within a second front rigid tube mounted to the front fork and a second front flexible tube mounted to the front neck;
   wherein, when the front fork is turned by a user tension is applied to the first or second front brake cable, thereby urging the front brake scissor assembly to contact the front wheels.

2. The training system of claim 1, wherein the front neck of each training device is hingedly attached to the front surface of the footboard and the rear neck of each training device is hingedly attached to the back surface of the footboard.

3. The training system of claim 2, wherein, when a user shifts its weight left or right, additional tension is applied to the first or second front brake cable of each training device, thereby urging the front brake scissor assembly of each training device to contact the front wheels with greater force as compared to when a user turns the front fork of each training device.

4. The training system of claim 1, wherein the braking system of each training device further comprises:
   (iv) a rear brake scissor assembly fixedly attached to the rear fork and including a first rear brake arm and a second rear brake arm;
   (v) a first rear brake cable having a first end fixedly attached to the first rear brake arm and a second end fixedly attached to the rear surface of the footboard, wherein the first rear brake cable is movably disposed within a first rear tube mounted to the rear fork and a first rear flexible tube disposed within the rear neck; and
   (vi) a second rear brake cable having a first end fixedly attached to the second rear brake arm and a second end fixedly attached to the rear surface of the footboard, wherein the second rear brake cable is movably disposed within a second rear tube mounted to the rear fork and a second rear flexible tube disposed within the rear neck,
   wherein, when the front fork is turned by a user tension is simultaneously applied to the first or second front brake cable and to the first or second rear brake cable, thereby urging the front brake scissor assembly to contact the front wheels and the rear brake scissor assembly to contact the rear wheels.

5. The training system of claim 4, wherein the front neck of each training device is hingedly attached to the front surface of the footboard and the rear neck of each training device is hingedly attached to the back surface of the footboard.

6. The training system of claim 5, wherein, when a user shifts its weight left or right, additional tension is applied to the first or second front brake cable of each training device, thereby urging the front brake scissor assembly of each training device to contact the front wheels and the rear brake scissor assembly of each training device to contact the rear wheels with greater force as compared to when a user turns the front fork.

7. The training system of claim 1, further comprising a first and second handle bar, each having a hand grip, and being detachably attached to the front fork of each training device.

8. The training system of claim 1, wherein the first and second training devices each further comprise a front torsional spring mounted to the pivotal attachment between the front neck and the front fork and a rear torsional spring mounted to the pivotal attachment between the rear neck and the rear fork.

9. The training system of claim 1, wherein the first and second training devices each comprise one front wheel attached to the front fork and one rear wheel attached to the rear fork.

10. The training system of claim 1, wherein the first and second training devices each comprise two concentric front wheels attached to the front fork and two concentric rear wheels attached to the rear fork.

11. The training system of claim 1, wherein the first and second training devices each further comprise: a motor fixedly mounted to the front fork and configured to provide rotational power to the front wheels, a motor fixedly mounted to the rear fork and configured to provide rotational power to the rear wheels, or a motor fixedly mounted to the front fork and a motor fixedly mounted to the rear fork, each of which being configured to provide rotational power to the respective front and rear wheels.

12. A training device comprising:
   (a) a footboard assembly comprising:
      (i) a first and second footboard, each having a top surface, a front surface and a back surface; and
      (ii) a front crossbar and a rear crossbar fixedly attached to each other by a frame bar, wherein the front and rear crossbars are configured to attach to the first and second footboards;
   (b) a front neck fixedly attached to the front crossbar of the footboard assembly and pivotally attached to a front fork;
   (c) a rear neck fixedly attached to the rear crossbar of the footboard assembly and pivotally attached to a rear fork;
   (d) one or more front wheels rotatably attached to the front fork;
   (e) one or more rear wheels rotatably attached to the rear fork;
   (f) a handle bar fixedly attached to the front fork and having a first and second hand grip; and
   (g) a first braking system comprising:
      (i) a first front brake scissor assembly fixedly attached to the front fork and including a first front brake arm and a second front brake arm;
      (ii) a first front brake cable having a first end fixedly attached to the first front brake arm and a second end fixedly attached to the front surface of the footboard, wherein the first front brake cable is movably disposed within a first front rigid tube mounted to the front fork and a first front flexible tube disposed within the front neck; and
      (iii) a second front brake cable having a first end fixedly attached to the second front brake arm and a second end fixedly attached to the front surface of the footboard, wherein the second front brake cable is movably disposed within a second front rigid tube mounted to the front fork and a second front flexible tube disposed within the front neck;
   (h) a second braking system comprising:
      (i) a second front brake scissor assembly fixedly attached to the front fork and including a third front brake arm and a fourth front brake arm;
      (ii) a third front brake cable having a first end fixedly attached to the third front brake arm and a second end fixedly attached to a first hand control disposed on the handlebar, wherein the third front brake cable is movably disposed within a second front flexible tube disposed along the handlebar; and
   wherein, when the front fork is turned by a user tension is applied to the first or second front brake cable, thereby urging the first front brake scissor assembly to contact the front wheels, and
   wherein, when a user deploys the first hand control, tension is applied to the third front brake cable, thereby urging the second front brake scissor assembly to contact the front wheels.

13. The training device of claim 12, wherein the first braking system further comprises:
   (iv) a first rear brake scissor assembly fixedly attached to the rear fork and including a first rear brake arm and a second rear brake arm;
   (v) a first rear brake cable having a first end fixedly attached to the first rear brake arm and a second end fixedly attached to the rear surface of the footboard, wherein the first rear brake cable is movably disposed within a first rear tube mounted to the rear fork and a first rear flexible tube disposed within the rear neck; and
   (vi) a second rear brake cable having a first end fixedly attached to the second rear brake arm and a second end fixedly attached to the rear surface of the footboard, wherein the second rear brake cable is movably disposed within a second rear tube mounted to the rear fork and a second rear flexible tube disposed within the rear neck,
   wherein, when the front fork is turned by a user tension is simultaneously applied to the first or second front brake cable and to the first or second rear brake cable, thereby urging the first front brake scissor assembly to contact the front wheels and urging the first rear brake scissor assembly to contact the rear wheels.

14. The training device of claim 13, wherein the second braking system further comprises:
   (iii) a second rear brake scissor assembly fixedly attached to the rear fork and including a third rear brake arm and a fourth rear brake arm;
   (iv) a third rear brake cable having a first end fixedly attached to the third rear brake arm and a second end fixedly attached to a second hand control disposed on the handlebar, wherein the third rear brake cable is movably disposed within a third rear flexible tube disposed under the front and rear necks,
   wherein, when a user deploys the second hand control, tension is applied to the third rear brake cable, thereby urging the second rear brake scissor assembly to contact the rear wheels.

15. The training device of claim 14, further comprising a plurality of adjustment barrels disposed at one or more ends of the first front brake cable, the second front brake cable, the third front brake cable, the first rear brake cable, the second rear brake cable, and the third rear brake cable.

16. The training device of claim 12, wherein the first and second footboards are hingedly attached to the front and rear crossbars.

* * * * *